(12) United States Patent
Choi

(10) Patent No.: US 7,588,840 B2
(45) Date of Patent: Sep. 15, 2009

(54) MAGNETIC THIN FILM AND METHOD OF FORMING THE SAME, MAGNETIC DEVICE AND INDUCTOR, AND METHOD OF MANUFACTURING MAGNETIC DEVICE

(75) Inventor: Kyung-Ku Choi, Tokyo (JP)

(73) Assignee: TDK Corporation, Tokyo (JP)

( * ) Notice: Subject to any disclaimer, the term of this patent is extended or adjusted under 35 U.S.C. 154(b) by 489 days.

(21) Appl. No.: 11/287,322

(22) Filed: Nov. 28, 2005

(65) Prior Publication Data

US 2006/0115684 A1  Jun. 1, 2006

(30) Foreign Application Priority Data

Nov. 30, 2004 (JP) .............................. 2004-347912
Nov. 30, 2004 (JP) .............................. 2004-347916

(51) Int. Cl.
*H01F 1/12* (2006.01)
*H01F 17/00* (2006.01)

(52) U.S. Cl. .................... 428/692.1; 428/611; 428/655; 428/686; 336/84 M; 336/177

(58) Field of Classification Search ........................ None
See application file for complete search history.

(56) References Cited

U.S. PATENT DOCUMENTS

| | | | | |
|---|---|---|---|---|
| 4,900,622 | A * | 2/1990 | Nakayama et al. | 428/336 |
| 5,998,048 | A * | 12/1999 | Jin et al. | 428/836.3 |
| 6,770,353 | B1 * | 8/2004 | Mardilovich et al. | 428/209 |
| 7,061,731 | B2 * | 6/2006 | Larson et al. | 360/324.12 |
| 2004/0126622 | A1 * | 7/2004 | Motohashi | 428/694 B |
| 2006/0003190 | A1 * | 1/2006 | Abarra et al. | 428/832.1 |
| 2007/0059564 | A1 * | 3/2007 | Klemmer et al. | 428/848.3 |

FOREIGN PATENT DOCUMENTS

EP  1473742 A1 * 11/2004

(Continued)

OTHER PUBLICATIONS

Ueda, Y., Takakura, W., and Yamada, A., J. Mag. Mag. Mat., 239, 2002, pp. 45-47.*

(Continued)

*Primary Examiner*—Kevin M Bernatz
(74) *Attorney, Agent, or Firm*—Oliff & Berridge, PLC

(57) ABSTRACT

A magnetic thin film with a high resonant frequency and superior high-frequency characteristics, and a magnetic device and an inductor with superior high-frequency characteristics are provided. A planar coil and a magnetic thin film are disposed on a substrate, and an inductor is formed between connection terminals. An obliquely-grown magnetic layer in the magnetic thin film is crystal-grown in an oblique direction with respect to a surface of the substrate (an obliquely-grown magnetic body). In order to make the obliquely-grown magnetic body exhibit soft magnetism in the obliquely-grown magnetic layer, an insulator is mixed into the obliquely-grown magnetic body. The obliquely-grown magnetic layer shows in-plane magnetocrystalline anisotropy, and the in-plane magnetocrystalline anisotropy is increased, and an anisotropic magnetic field is increased. The anisotropic magnetic field can be changed only by a crystal growth direction of the obliquely-grown magnetic layer, so without reducing saturation magnetization, the anisotropic magnetic field can be increased, and the resonant frequency of the magnetic thin film can be improved.

16 Claims, 21 Drawing Sheets

FOREIGN PATENT DOCUMENTS

JP  A-05-114530  5/1993
JP  A-2002-020864  1/2002

OTHER PUBLICATIONS

S. Ohnuma et al.; "Magnetostriction and soft magnetic properties of $(Co_{1-x}Fe_x)$-Al-O granular films with high electrical resistivity"; *Journal of Applied Physics*; vol. 85, No. 8; Apr. 15, 1999; pp. 4574-4576.

Jongill Hong et al.; "Microstructures of FeTaN Films in the Neck Region of Magnetic Recording Heads"; *IEEE Transactions on Magnetics*; vol. 37, No. 4; Jul. 2001; pp. 3039-3042.

W. Metzdorf et al.; "Negative Oblique-Incidence Anisotropy in Magnetostriction-Free Permalloy Films"; *Phys. Stat. Sol.*; vol. 17; 1966; pp. 285-294.

* cited by examiner

MAGNETIC THIN FILM AND METHOD OF FORMING THE SAME, MAGNETIC DEVICE AND INDUCTOR, AND METHOD OF MANUFACTURING MAGNETIC DEVICE

BACKGROUND OF THE INVENTION

1. Field of the Invention

The present invention relates to a magnetic thin film with superior high-frequency characteristics in a GHz band and a method of forming the magnetic thin film, a magnetic device and an inductor including such a magnetic thin film, and a method of manufacturing a magnetic device.

2. Description of the Related Art

In recent years, as an integrated passive component, a planar magnetic device such as a thin film inductor or a thin film transformer is desired to be used at a high frequency, and a magnetic thin film with superior high-frequency characteristics in a GHz band is desired accordingly.

Suggestions for improving the high-frequency characteristics of the magnetic thin film include increasing a resonant frequency, preventing a high-frequency current loss and so on. Among them, in order to increase the resonant frequency of the magnetic thin film, it is necessary to increase the values of an anisotropic magnetic field Hk and saturation magnetization $4\pi$ Ms on the basis of the following formula (1).

[Mathematical Formula 1]

$$f_r = \frac{\gamma}{2\pi}\sqrt{4\pi H_K \cdot M_S}$$

$$\begin{pmatrix} f_r\text{: resonant frequency} \\ \gamma\text{: gyromagnetic constant} \\ H_k\text{: anisotropic magnetic field} \\ M_S\text{: saturation magnetization} \end{pmatrix}$$

As a technique for providing the anisotropic magnetic field Hk for the magnetic thin film, a technique of treating the magnetic thin film with heat in a magnetic field (for example, refer to Japanese Unexamined Patent Application Publication No. H5-114530) is conventionally used, and a technique of forming a magnetic layer in a magnetic field (for example, refer to Japanese Unexamined Patent Application Publication No. 2002-20864) is also used recently.

Moreover, when such a magnetic thin film is actually applied to a magnetic device, it is important that the value of the anisotropic magnetic field Hk is not only large but also freely controllable according to purposes of use or applications.

For example, in S. Ohnuma et al. "Magnetostriction and soft magnetic properties of $(Co_{1-x}Fe_x)$—Al—O granular films with high electrical resistivity", Journal of Applied Physics, American Institute of Physics, Apr. 15, 1999, Vol. 85, No. 8, p. 4574-4576, a technique of controlling the anisotropic magnetic field Hk through changing the composition of cobalt (Co) and iron (Fe) in a $(Co_{1-x}Fe_x)$—Al—O magnetic film is disclosed.

SUMMARY OF THE INVENTION

However, in the technique in Japanese Unexamined Patent Application Publication No. H5-114530, the limit of the anisotropic magnetic field Hk which can be provided is approximately $15\times10^3/4\pi$ [A/m] (=19 Oe), and it is difficult to provide a larger anisotropic magnetic field Hk than the limit to increase a resonant frequency fr. Moreover, in the technique in Japanese Unexamined Patent Application Publication No. 2002-20864, the anisotropic magnetic field Hk can be provided; however, it is difficult to freely control the value of the anisotropic magnetic field Hk.

Further, in the technique in S. Ohnuma et al. "Magnetostriction and soft magnetic properties of $(Co_{1-x}Fe_x)$—Al—O granular films with high electrical resistivity", Journal of Applied Physics, American Institute of Physics, Apr. 15, 1999, Vol. 85, No. 8, p. 4574-4576, the anisotropic magnetic field Hk can be freely controlled; however, as shown in FIGS. 1(c) and (d) in this literature, when the anisotropic magnetic field Hk is changed by the composition of Co and Fe (refer to FIG. 1(d)), a saturated magnetic flux density Bs (synonymous with saturation magnetization $4\pi$ Ms) is also changed accordingly (refer to FIG. 1(c)). In other words, as the anisotropic magnetic field Hk increases, the saturated magnetic flux density Bs decreases, so on the basis of the above formula (1), the resonant frequency fr is hardly changed, and it is difficult to increase the value of the resonant frequency fr.

Thus, in conventional technologies to change the anisotropic magnetic field of the magnetic thin film by the above-described techniques, it is difficult to obtain a magnetic thin film with a high resonant frequency and superior high-frequency characteristics. Therefore, it is difficult to obtain a magnetic device with superior high-frequency characteristics.

In view of the foregoing, it is desirable to provide a magnetic thin film with a high resonant frequency and superior high-frequency characteristics and a method of forming the magnetic thin film.

Moreover, it is desirable to provide a magnetic device and an inductor with superior high-frequency characteristics, and a method of manufacturing a magnetic device.

A magnetic thin film of an embodiment of the invention includes: an obliquely-grown magnetic layer including an insulating material and a magnetic material which exhibits soft magnetism through mixing the insulating material into the magnetic material, the obliquely-grown magnetic layer being formed on a substrate, and being crystal-grown in a columnar form in an oblique direction with respect to a laminate surface.

In this description, "exhibit soft magnetism" means that regardless of magnetic properties of the magnetic material before mixing an insulating material, that is, regardless of whether the magnetic material exhibits soft magnetism or hard magnetism, when the insulating material is mixed into the magnetic material, the magnetic material increases a tendency toward soft magnetism, compared to the magnetic material before mixing the insulating material, and the level of soft magnetism is no object. Moreover, "a laminate surface" means a surface where a multilayer film is laminated, and the laminate surface is generally in parallel to a substrate surface. Further, "a columnar form" means not only literally the form of a column but also a form having a major axis and a minor axis.

A magnetic device of an embodiment of the invention includes: a coil; and a magnetic thin film disposed on one side of the coil; wherein the magnetic thin film includes an obliquely-grown magnetic layer including an insulating material and a magnetic material which exhibits soft magnetism through mixing the insulating material into the magnetic material, and being crystal-grown in a columnar form in an oblique direction with respect to a laminate surface.

An inductor of an embodiment of the invention includes a magnetic device with the above-described structure.

In the magnetic thin film, the magnetic device and the inductor of an embodiment of the invention, the obliquely-grown magnetic layer is crystal-grown in a columnar form in an oblique direction with respect to the laminate surface, so in-plane magnetic anisotropy depends upon the direction. In other words, strong in-plane magnetic anisotropy occurs through forming an angle with a vertical direction with respect to the laminate surface. Moreover, in the obliquely-grown magnetic layer, the insulating material is mixed into the magnetic material so that the magnetic material exhibits soft magnetism, so the microcrystallization of the magnetic material can be accelerated, and the in-plane magnetocrystalline anisotropy can be increased, and the resistivity of the magnetic thin film can be increased, and a current loss in the magnetic thin film can be prevented.

The magnetic thin film of an embodiment of the invention may further include a vertically grown magnetic layer including the insulating material and the magnetic material, and being crystal-grown in a columnar form in a vertical direction with respect to the laminate surface. In this case, an insulating layer may be included between the obliquely-grown magnetic layer and the vertically grown magnetic layer. Moreover, a plurality of the obliquely-grown magnetic layers may be included, and an insulating layer may be included between the plurality of obliquely-grown magnetic layers.

In the magnetic device of an embodiment of the invention, at least one of the magnetic thin films may further include a vertically grown magnetic layer including the insulating material and the magnetic material and being crystal-grown in a columnar form in a vertical direction with respect to the laminate surface. Moreover, at least one of the magnetic thin films may include at least one insulating layer between the obliquely-grown magnetic layer and the vertically grown magnetic layer, or in the case where at least one of the magnetic thin films includes a plurality of obliquely-grown magnetic layers, an insulating layer may be included between the plurality of obliquely-grown magnetic layers.

In the case where the vertically grown magnetic layer or the insulating layer is included in such a manner, a high-frequency current is blocked by the insulating layer, and an overcurrent loss can be prevented. Moreover, the generation of a reflux magnetic domain (or triangular magnetic domain) can be prevented by magnetostatic coupling between magnetic layers, and soft magnetic properties can be improved. As a result, magnetic permeability or the performance index (Q=μ' (a real part of magnetic permeability)/μ" (an imaginary part of magnetic permeability)) at a high frequency can be improved.

In the magnetic thin film according to the embodiment of the invention, a plurality of obliquely-grown magnetic layers may be included, and components parallel to the laminate surface of the crystal growth directions in at least one pair of obliquely-grown magnetic layers may be substantially orthogonal to each other. Moreover, it is preferable that in a pair of adjacent obliquely-grown magnetic layers, an angle which a crystal growth direction in one obliquely-grown magnetic layer forms with the laminate surface gradually increases from one end of the laminate surface to the other end of the laminate surface, and an angle which a crystal growth direction in the other obliquely-grown magnetic layer forms with the laminate surface gradually increases from the other end of the laminate surface to one end of the laminate surface. Thus, in the case where angles which the crystal growth directions in the pair of adjacent obliquely-grown magnetic layers form with the laminate surface change inversely with each other from one end of the laminate surface to the other end of the laminate surface, variations in the angles with respect to a position on the laminate surface can be reduced.

In the magnetic device of an embodiment of the invention, the magnetic thin films are preferably disposed on both sides of the coil so that the coil is sandwiched between the magnetic thin films. In this case, in a pair of obliquely-grown magnetic layers corresponding to a pair of magnetic thin films disposed on both side of the coil, components parallel to the laminate surface of the crystal growth directions may be substantially orthogonal to each other. Moreover, a pair of obliquely-grown magnetic layers corresponding to a pair of magnetic thin films disposed on both sides of the coil may be plane symmetric to each other with reference to a central surface of the coil in a section vertical to the laminate surface. Further, it is preferable that in a pair of obliquely-grown magnetic layers corresponding to a pair of magnetic thin films disposed on both sides of the coil, an angle which a crystal growth direction in one obliquely-grown magnetic layer forms with the laminate surface gradually increases from one end of the laminate surface to the other end of the laminate surface, and an angle which a crystal growth direction in the other obliquely-grown magnetic layer forms with the laminate surface gradually increases from the other end of the laminate surface to one end of the laminate surface. Thus, in the case where angles which the crystal growth directions in the pair of obliquely-grown magnetic layer form with the laminate surface change inversely with each other from one end of the laminate surface to the other end of the laminate surface, variations in the angles with respect to a position on the laminate surface can be reduced.

In the magnetic thin film and the magnetic device of an embodiment of the invention, the above-described magnetic material preferably includes iron (Fe) or cobalt iron (CoFe).

A method of forming a magnetic thin film of an embodiment of the invention includes a first laminating step of laminating a first obliquely-grown magnetic layer on the top of a substrate, the first obliquely-grown magnetic layer including an insulating material and a magnetic material which exhibits soft magnetism through mixing the insulating material into the magnetic material, and being crystal-grown in a columnar form in an obliquely direction with respect to a laminate surface.

A method of manufacturing a magnetic device of an embodiment of the invention includes a first laminating step of forming a first obliquely-grown magnetic layer on one side of a substrate, the first obliquely-grown magnetic layer including an insulating material and a magnetic material which exhibits soft magnetism through mixing the insulating material into the magnetic material, and being crystal-grown in a columnar form in a obliquely direction with respect to a laminate surface; and a second laminating step of forming a second obliquely-grown magnetic layer on the opposite side of the first obliquely-grown magnetic layer from the substrate, the second obliquely-grown magnetic layer including the insulating material and the magnetic material, and being crystal-grown in a columnar form in an oblique direction with respect to the laminate surface.

The method of forming a magnetic thin film of an embodiment of the invention preferably further includes a second laminating step of laminating a second obliquely-grown magnetic layer on the top of the first obliquely-grown magnetic layer, the second obliquely-grown magnetic layer including the insulating material and the magnetic material, and being crystal-grown in a columnar form in an oblique direction with respect to the laminate surface, and a step of rotating the substrate 180° in an in-plane direction between the first laminating step and the second laminating step.

In this case, "rotating 180° in an in-plane direction" means not only the case where the substrate rotates on its axis in an in-plane direction but also the case where the substrate revolves in an in-plane direction.

The method of manufacturing a magnetic device of an embodiment of the invention preferably further includes a step of rotating the substrate 180° in an in-plane direction between the first laminating step and the second laminating step.

In the case where such a step is included between the first laminating step and the second laminating step, angles which the crystal growth directions in the first obliquely-grown magnetic layer and the second obliquely-grown magnetic layer form with the laminate surface changes inversely with each other from one end of the laminate surface to the other end of the laminate surface, and variations in the angles with respect to a position on the laminate surface can be reduced.

In the magnetic thin film or the method of forming a magnetic thin film of an embodiment of the invention, the obliquely-grown magnetic layer is crystal-grown in a columnar form in an oblique direction with respect to the laminate surface, and the insulating material is mixed into the magnetic material in the obliquely-grown magnetic layer, so the obliquely-grown magnetic layer shows in-plane magnetocrystalline anisotropy, and the in-plane magnetocrystalline anisotropy can be increased, and the anisotropic magnetic field can be increased. Therefore, without changing the composition of the magnetic thin film, the anisotropic magnetic field can be changed only by the crystal growth direction of the obliquely-grown magnetic layer, so without reducing the saturation magnetization, the anisotropic magnetic field can be increased, and the resonant frequency of the magnetic thin film can be improved. Thus, a magnetic thin film with superior high-frequency characteristics can be obtained.

Moreover, in the magnetic device, the inductor or the method of manufacturing a magnetic device of an embodiment of the invention, the obliquely-grown magnetic layer in the magnetic thin film is crystal-grown in a columnar form in an oblique direction with respect to the laminate surface, and the insulating material is mixed into the magnetic material in the obliquely-grown magnetic layer, so the obliquely-grown magnetic layer shows in-plane magnetocrystalline anisotropy, and the in-plane magnetocrystalline anisotropy can be increased, and the anisotropic magnetic field can be increased. Therefore, without changing the composition of the magnetic thin film, the anisotropic magnetic field can be changed only by the crystal growth direction of the obliquely-grown magnetic layer, so without reducing the saturation magnetization, the anisotropic magnetic field can be increased, and the resonant frequency of the magnetic thin film can be improved. Thus, a magnetic thin film with superior high-frequency characteristics can be obtained, and a magnetic device or an inductor with superior high-frequency characteristics can be obtained.

Moreover, in the magnetic thin film, the method of forming a magnetic thin film, the magnetic device, the inductor, or the method of manufacturing a magnetic device of an embodiment of the invention, the resistivity of the magnetic thin film is increased through mixing the insulating material into the magnetic material, so an overcurrent loss in the magnetic thin film can be prevented, and the high-frequency characteristics (performance index) can be further improved.

In particular, in the magnetic thin film of an embodiment of the invention, in the case where the vertically grown magnetic layer or the insulating layer is included, the magnitude of the anisotropic magnetic field can be controlled through controlling the thickness of the obliquely-grown magnetic layer.

Moreover, in the magnetic device or the inductor of an embodiment of the invention, in the case where the magnetic thin film includes the vertically grown magnetic layer or the insulating layer, the generation of a reflux magnetic domain (or a triangular magnetic domain) can be prevented by magnetostatic coupling between magnetic layers, and soft magnetic properties can be improved. As a result, the magnetic permeability or the performance index ($Q=\mu'$ (a real part of magnetic permeability)/$\mu''$ (an imaginary part of magnetic permeability)) at a high frequency can be improved.

In particular, in the magnetic thin film or the method of forming a magnetic thin film of an embodiment of the invention, in the case where angles which the crystal growth directions in a pair of adjacent obliquely-grown magnetic layers form with the laminate surface change inversely with each other from one end of the laminate surface to the other end of the laminate surface, variations in the angles with respect to a position on the laminate surface can be reduced, so manufacturing yield can be improved, and manufacturing cost can be reduced.

Further, in particular, in the magnetic device, the inductor or the method of manufacturing a magnetic device of an embodiment of the invention, in the case where a pair of magnetic thin films are disposed on both sides of the coil, and angles which the crystal growth directions in a pair of obliquely-grown magnetic layers corresponding to the pair of magnetic thin films form with a coil extending surface change inversely with each other from one end of the coil extending surface to the other end of the coil extending surface, variations in the angles with respect to a position on the coil extending surface can be reduced, so manufacturing yield can be improved, and manufacturing cost can be reduced.

Other and further objects, features and advantages of the invention will appear more fully from the following description.

DETAILED DESCRIPTION OF THE PREFERRED EMBODIMENTS

Best modes for carrying out the invention (hereinafter simply referred to as embodiments) will be described in detail below referring to the accompanying drawings.

First Embodiment

Figure 1A:
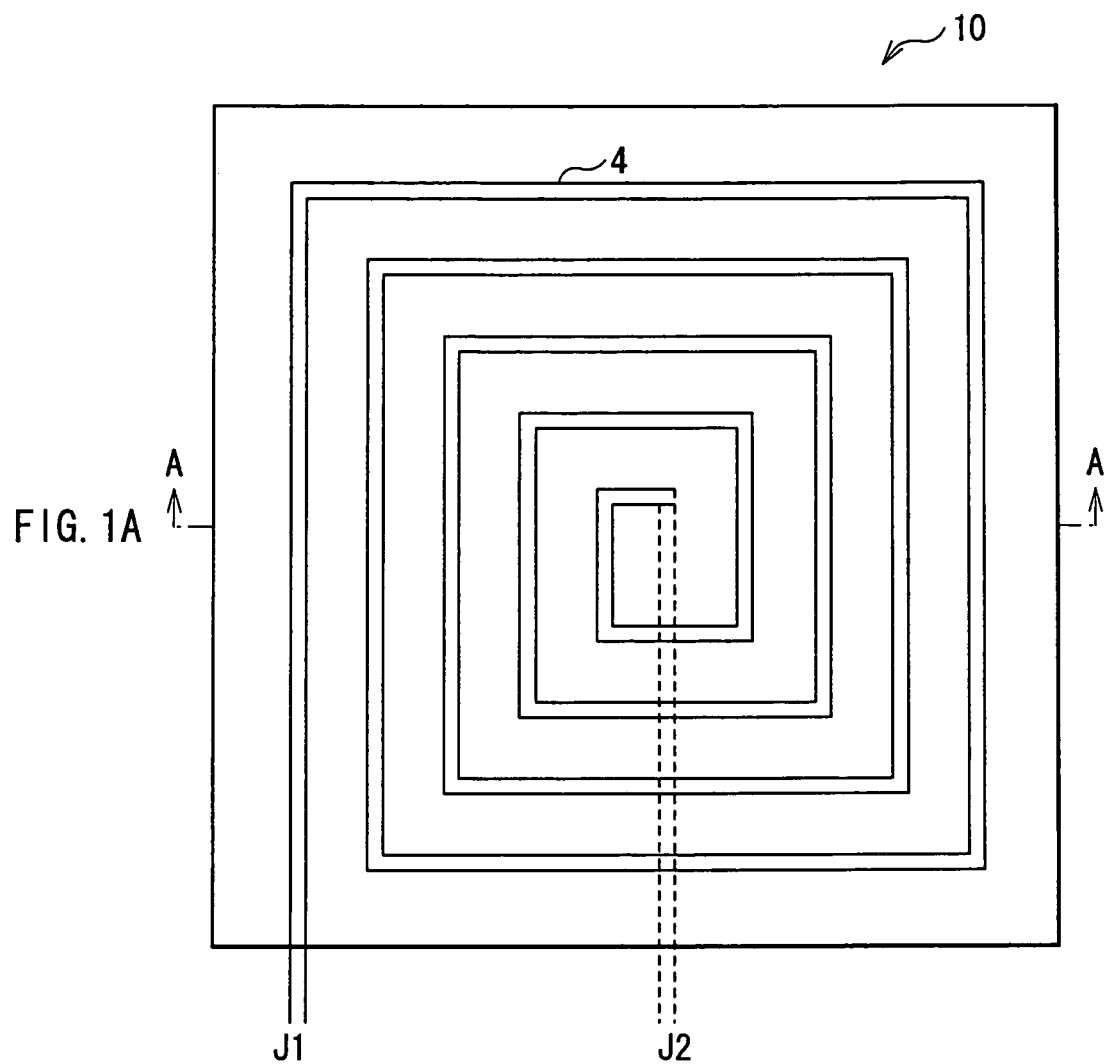
FIGS. 1A and 1B are schematic views of a magnetic device according to a first embodiment of the invention.
Figure 1B:
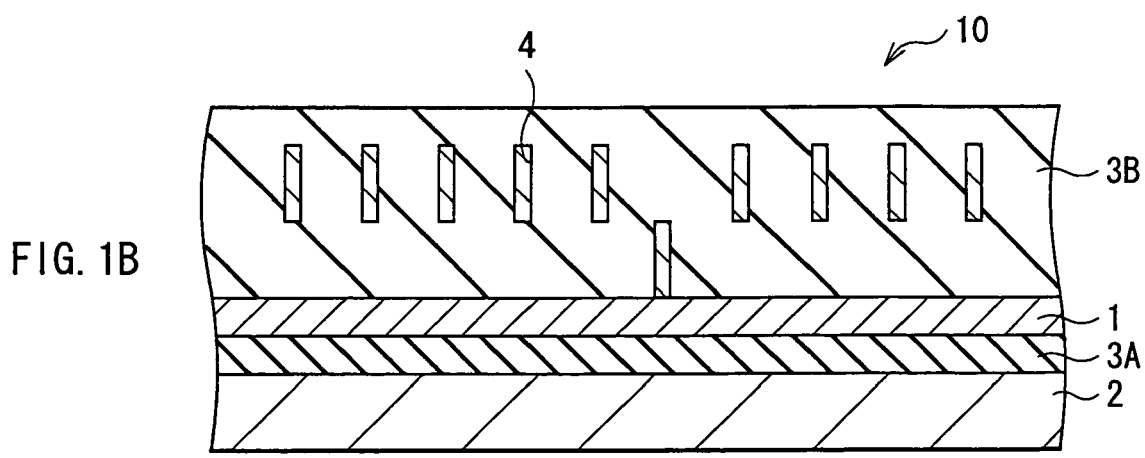

FIGS. 1A and 1B schematically show the structure of an inductor 10 as a magnetic device according to a first embodiment of the invention, and FIG. 1A shows a top view, and FIG. 1B shows a schematic sectional view taken along a line A-A of FIG. 1A. The inductor 10 includes a substrate 2, an insulating layer 3A and a magnetic thin film 1 which are formed on the substrate 2, a planar coil 4 which is formed on the magnetic thin film 1 in a spiral shape, and an insulating layer 3B which is formed on the magnetic thin film 1 so as to be laid over the planar coil 4.

The substrate 2 is made of, for example, a glass substrate, a ceramic material substrate, a semiconductor substrate, a resin substrate or the like. Examples of the ceramic material include alumina, zirconia, silicon carbonate, silicon nitride, aluminum nitride, steatite, mullite, cordierite, forsterite, spinel, ferrite and so on. The insulating layers 3A and 3B are made of, for example, an insulating ceramic material such as silicon oxide ($SiO_2$), photosensitive polyimide, photosensitive epoxy, BCB (benzocyclobutane) or the like. The planar coil 4 is formed through, for example, copper plating, sputtering or the like. Moreover, connection terminals J1 and J2 are attached from both ends of the planar coil 4 to the outside of the substrate 2.

The magnetic thin film 1 includes an obliquely-grown magnetic layer 11 which is grown in a columnar form in an oblique direction with respect to a surface of the substrate 2 (and a coil extending surface; the same holds true for the following) as will be described later, and exhibits high in-plane magnetocrystalline anisotropy. The magnetic thin film 1 with such a structure has a high resonant frequency and superior high-frequency characteristics in a GHz band as will be described later.

Thus, in the inductor 10, the magnetic thin film 1 is disposed together with the planar coil 3 on the substrate 2 with an insulating layer 3 in between, so an inductor is formed between the connection terminals J1 and J2. When a plurality of planar coils 4 are included in parallel in the inductor 10, a transformer can be formed.

Figure 2:
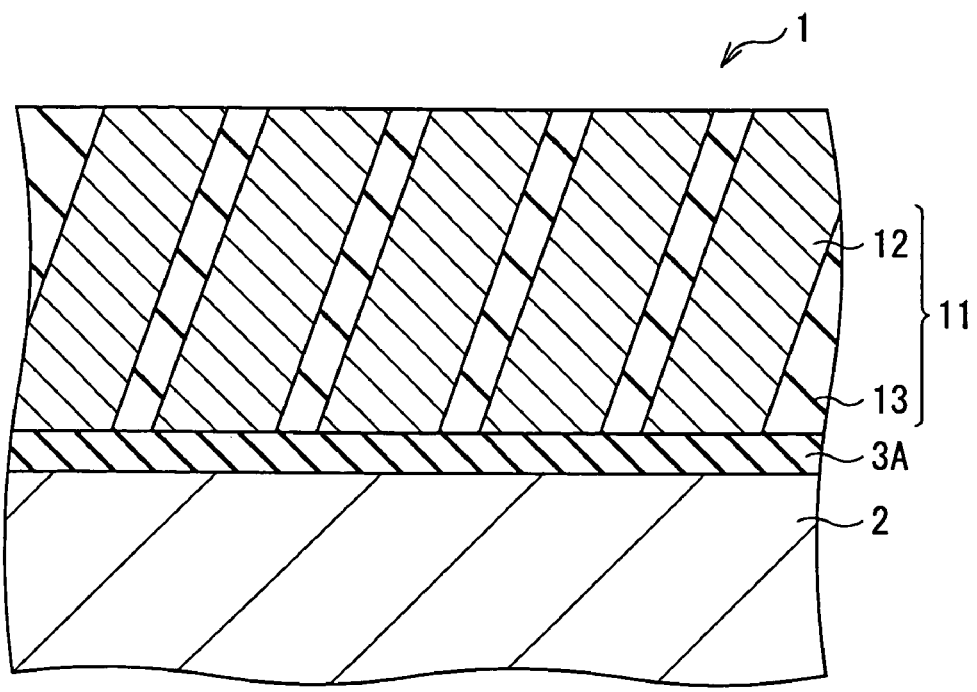
FIG. 2 is a schematic sectional view of the magnetic thin film shown in FIGS. 1A and 1B.

FIG. 2 shows a schematic sectional view of the magnetic thin film 1. The magnetic thin film 1 has a structure in which the obliquely-grown magnetic layer 11 is laminated on the substrate 2.

The obliquely-grown magnetic layer 11 includes an obliquely-grown magnetic body 12 and an insulator 13, and as shown in FIG. 2, the obliquely-grown magnetic layer 11 has a structure in which the insulator 13 is mixed into the obliquely-grown magnetic body 12.

The obliquely-grown magnetic body 12 is made of a magnetic material which exhibits soft magnetism through mixing the insulator 13 into the magnetic material, and iron (Fe) or cobalt iron (CoFe) which is a ferromagnetic material is preferable. It is because these ferromagnetic materials have high saturation magnetization, so even if the ferromagnetic material exhibits some soft magnetism, while the ferromagnetic material still has high saturation magnetization, the ferromagnetic material can obtain a higher resonant frequency fr.

Figure 3:
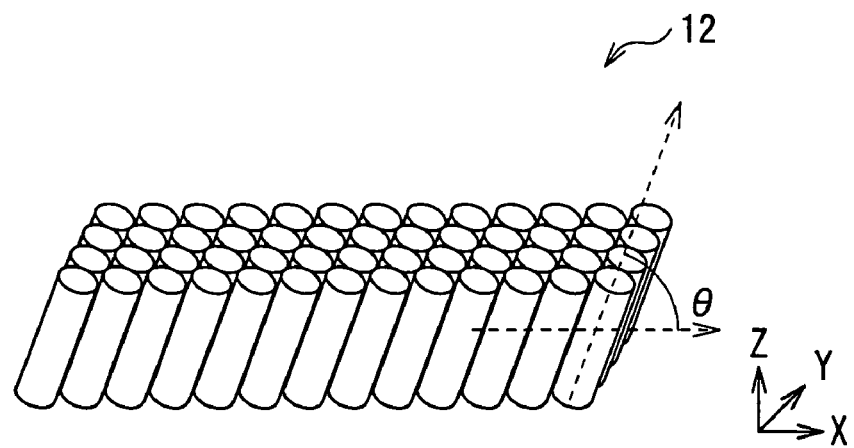
FIG. 3 is a schematic view for describing an obliquely-grown magnetic body.

As shown in FIG. 3, the obliquely-grown magnetic body 12 grows in a columnar form in an oblique direction with respect to the surface of the substrate 2 (at an angle θ with respect to an xy plane in FIG. 3 in the case where the xy plane is a coil extending surface parallel to the surface of the substrate 2). The size of a columnar crystal of the obliquely-grown magnetic body 12 is, for example, approximately 15 nm in a minor axis direction and approximately 500 nm in a major axis direction. As the obliquely-grown magnetic body 12 is crystal-grown in such a manner, as will be described later, the obliquely-grown magnetic layer 11 exhibits more in-plane magnetocrystalline anisotropy. Further, when an angle (the angle θ in FIG. 3) which the crystal growth direction in the obliquely-grown magnetic body 12 forms with the coil extending surface is changed, the magnitude of the in-plane magnetocrystalline anisotropy can be controlled.

The insulator 13 is made of, for example, an oxide such as aluminum oxide ($Al_2O_3$), silicon oxide ($SiO_2$), zirconium oxide ($ZrO_2$), yttrium oxide ($Y_2O_3$), titanium oxide ($TiO_2$), hafnium oxide ($HfO_2$) or cerium oxide ($CeO_2$), a fluoride such as magnesium fluoride ($MgF_2$), calcium fluoride ($CaF_2$)

or barium fluoride ($BaF_2$), a nitride such as aluminum nitride (AlN), boron nitride (BN) or silicon nitride ($Si_3N_4$). The insulator 13 makes the obliquely-grown magnetic body 12 exhibit soft magnetism as described above, and increases the resistivity of the magnetic thin film. More specifically, as will be described later, the insulator 13 accelerates the microcrystallization of the obliquely-grown magnetic body 12 to improve soft magnetic properties, and prevents a high-frequency current loss in the magnetic thin film 1.

In the magnetic thin film 1 with such a structure according to the embodiment, the obliquely-grown magnetic layer 11 is crystal-grown in a columnar form in an oblique direction with respect to the surface of the substrate 2 (that is, the obliquely-grown magnetic layer 11 includes the obliquely-grown magnetic body 12), so magnetic properties are different between its direction and a direction perpendicular to the direction in the coil extending surface.

It is considered that the obliquely-grown magnetic layer 11 with such a structure exhibits in-plane magnetocrystalline anisotropy because of magnetic shape anisotropy of the obliquely-grown magnetic body 12, stress anisotropy or the like.

Moreover, as the insulator 13 is mixed into the obliquely-grown magnetic body 12 in the obliquely-grown magnetic layer 11, the obliquely-grown magnetic body 12 exhibits soft magnetism, and the resistivity of the magnetic thin film 1 is increased. In other words, when the insulator 13 in which a grain boundary exists is included, the crystal of the obliquely-grown magnetic layer 11 is pulverized into small pieces so as to accelerate microcrystallization of the obliquely-grown magnetic body 12, and the resistivity is increased so as to prevent a current loss in the magnetic thin film 1. Therefore, the resonant frequency is increased through increasing in-plane magnetocrystalline anisotropy of the obliquely-grown magnetic layer 11 (increasing an anisotropic magnetic field), and a loss by a high-frequency current can be prevented.

Figure 4:
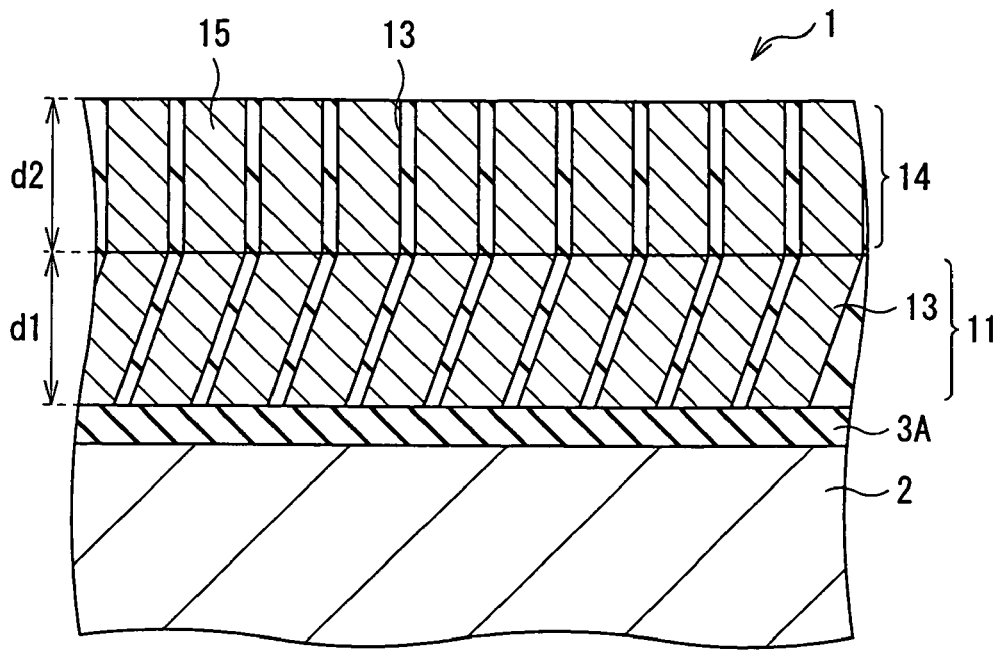
FIG. 4 is a schematic sectional view for describing the case where a vertically grown magnetic layer is included.

As shown in FIG. 4, the magnetic thin film 1 according to the embodiment may include a vertically grown magnetic layer 14 including a vertically grown magnetic body 15 which is grown in a columnar form in a vertical direction with respect to a coil extending surface parallel to the substrate 2 in addition to the obliquely-grown magnetic layer 11 including the obliquely-grown magnetic body 12. When such a vertically grown magnetic layer 14 is included, the crystal growth of the obliquely-grown magnetic body 12 in an oblique direction in the obliquely-grown magnetic layer 11 can be stopped, and the anisotropic magnetic field is further increased. It is because by crystal overgrowth in an oblique direction, the monocrystallization of the obliquely-grown magnetic body 12 is accelerated, and the anisotropic magnetic field is reduced. Moreover, when a ratio between the thickness of the obliquely-grown magnetic layer 11 (a thickness d1 in FIG. 4) and the thickness of the vertically grown magnetic layer 14 (a thickness d2 in FIG. 4) is changed, the magnitude of the anisotropic magnetic field can be freely controlled. The insulator 13 is not necessarily mixed into the vertically grown magnetic layer 14. It is because unlike the obliquely-grown magnetic layer 11, it is not necessary to accelerate the microcrystallization of the vertically grown magnetic body 15.

Figure 5:
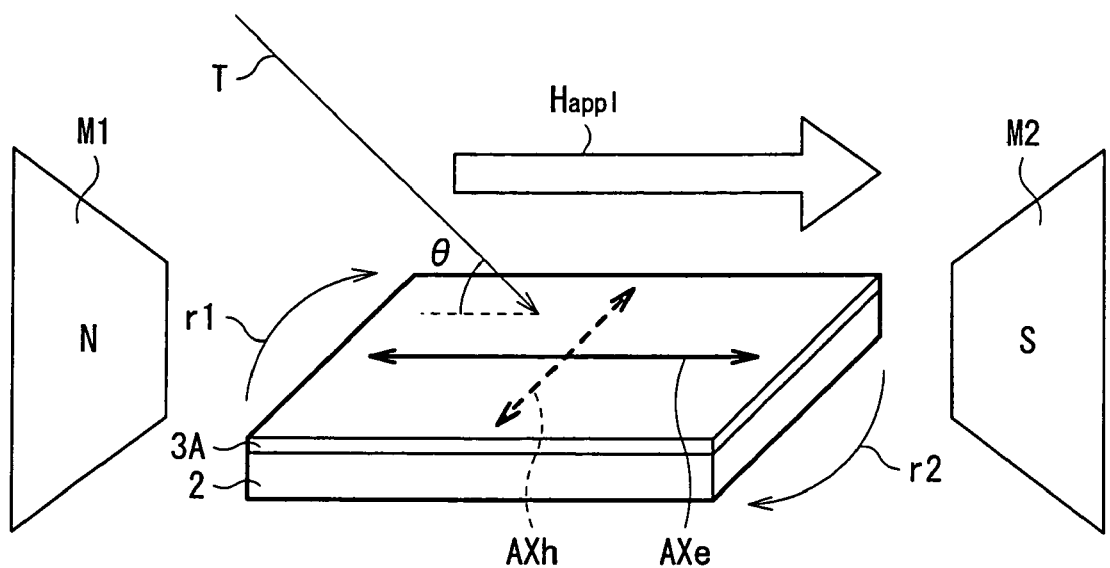
FIG. 5 is a schematic view for describing a method of forming a magnetic thin film.

Next, referring to FIG. 5, an example of a method of manufacturing the inductor 10 including the magnetic thin film 1 with such a structure (in the case where the magnetic thin film 1 is made of $(Co_{30}Fe_{70})_{0.983}Al_{0.107}O$), mainly a method of forming the magnetic thin film 1 will be described below. FIG. 5 schematically shows an example of the method of forming the magnetic thin film 1.

The magnetic thin film 1 according to the embodiment is formed by a vacuum thin film forming method, and the magnetic thin film 1 is preferably formed by sputtering, because a film made of an oxide is easily formed. More specifically, RF sputtering, DC sputtering, magnetron sputtering, ion beam sputtering, inductively coupled RF plasma assisted sputtering, ECR sputtering, facing targets sputtering or the like is used. In the following description, the case where the magnetic thin film 1 is formed by sputtering is described; however, sputtering is a specific example of the embodiment, and any other vacuum thin film forming method (for example, such as vapor deposition) can be used.

At first, the insulating layer 3A is formed on the substrate 2 by, for example, photolithography, and the magnetic thin film 1 is formed on the insulating layer 3A. The magnetic thin film 1 is formed through the following steps. The substrate 2 made of the above-described material is fixed, and the material of the obliquely-grown magnetic layer 11, that is, the material of the obliquely-grown magnetic body 12 ($Co_{30}Fe_{70}$ in this case) and the material of the insulator 13 ($Al_2O_3$ in this case) are applied to the substrate 2 in an oblique direction (at an angle θ, for example, approximately 30° to 60°) as shown by an arrow T. At this time, a film is formed while applying a fixed applied magnetic field Happl (for example, $100 \times 10^3/4\pi$ [A/m] (=100 Oe) or more) by magnets M1 and M2 (in the drawing, the N pole of the magnet M1 and the S pole of the magnet M2 are shown). An easy magnetic axis Axe is generated along the applied magnetic field Happl, and a hard magnetization axis Axh is generated orthogonal to the applied magnetic field Happl, and the magnitude of the anisotropic magnetic field Hk generated by the applied magnetic field Happl is approximately 50 Oe or less (44 Oe or less in this case). Moreover, the obliquely-grown magnetic body 12 of the obliquely-grown magnetic layer 11 is grown along an easy magnetization axis Axe direction. The thickness d1 of the obliquely-grown magnetic layer 11 is, for example, 1 μm or less.

As a method of forming the obliquely-grown magnetic layer 11 by sputtering, co-sputtering using a target made of the material of the obliquely-grown magnetic body 12 and a target made of the material of the insulator 13, or sputtering using a target made of a mixture with the composition of the obliquely-grown magnetic layer 11 (in this case $(Co_{30}Fe_{70})_{0.983}Al_{0.107}O$) is cited.

As conditions for sputtering, the base vacuum is, for example, less than $133 \times 10^{-7}$ Pa ($\approx 1 \times 10^{-7}$ Torr), and the sputtering pressure is, for example, approximately $0.5 \times 133 \times 10^{-3}$ Pa ($\approx 0.5$ mTorr) to $133 \times 10^{-2}$ Pa ($\approx 10$ mTorr).

In order to form the above-described vertically grown magnetic layer 14, as shown by arrows r1 and r2 in FIG. 5, sputtering may be performed while rotating the substrate 2, and irrespective of the direction of the applied magnetic field Happl, a vertically grown magnetic body crystal 61 is grown in a vertical direction with respect to the surface of the substrate 2. Therefore, when a magnetic layer is formed on the substrate 2, through adjusting the duration of fixing the substrate 2 and the duration of rotating the substrate 2, the ratio between the thickness d1 of the obliquely-grown magnetic layer 11 and the thickness d2 of the vertically grown magnetic layer 14 can be set freely.

Next, the planar coil 4 and an insulating layer 3B which are made of the above-described materials are formed on the magnetic thin film 1 formed by such a manner. The planar coil 4 is formed by, for example, electrolytic copper plating. Moreover, the number of L/S turns of the planar coil 4 is set to, for example, approximately 10 to 500 μm/10 to 50 μm, and the number of turns is set to, for example, approximately 5 to 20. The insulating layer 3B is formed by, for example, photolithography. Thus, the inductor 10 with a structure shown in FIGS. 1A and 1B through 4 is formed.

Figure 6:
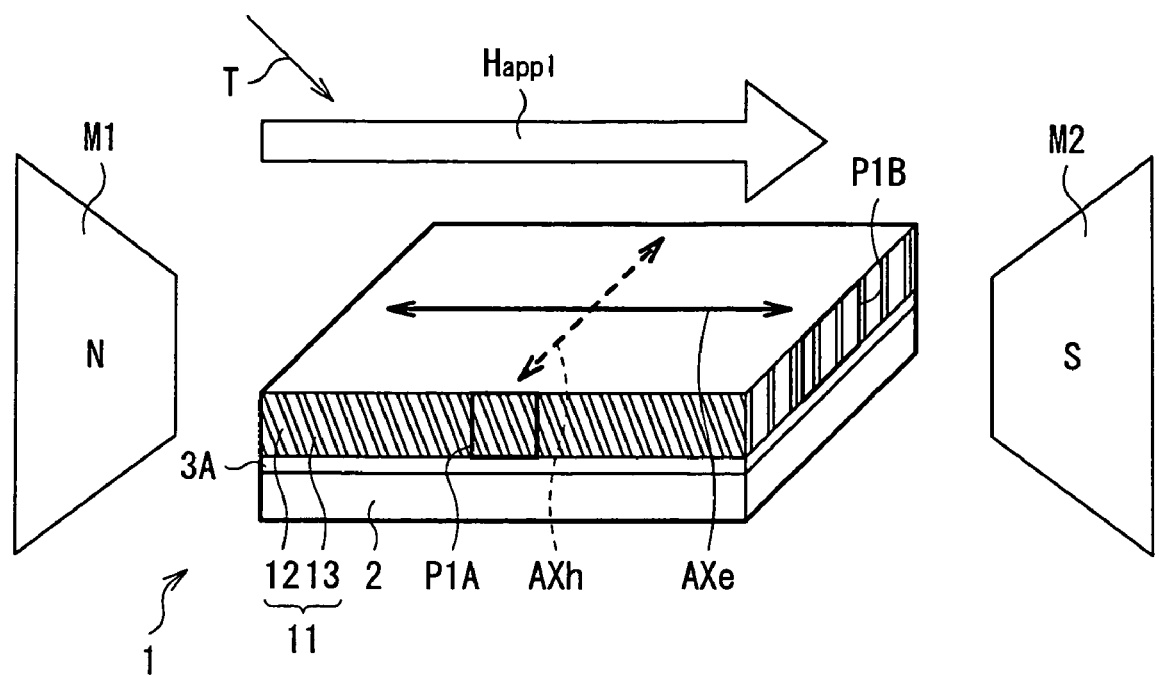
FIG. 6 is a schematic view for describing an example of a magnetic thin film formed by the forming method shown in FIG. 5.
Figure 7A:
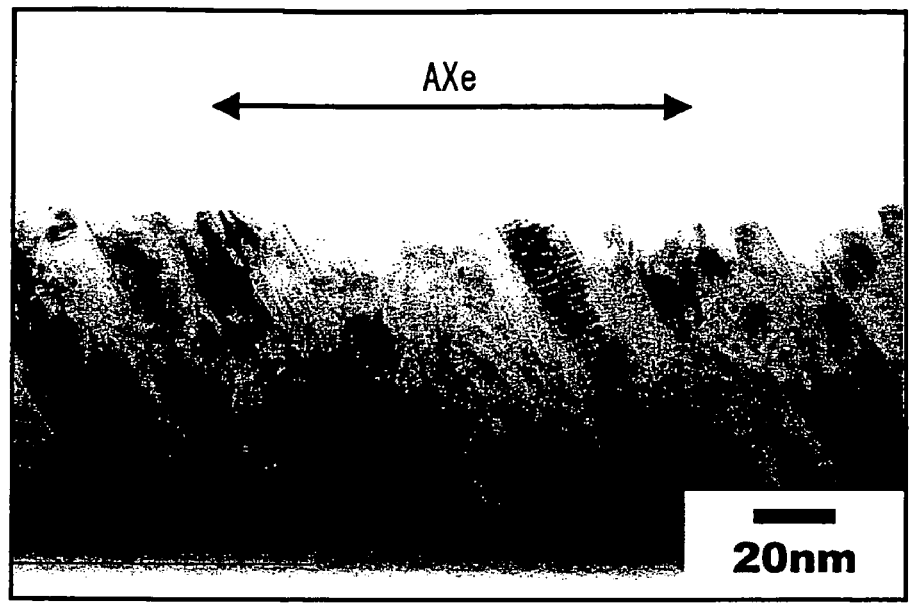
FIGS. 7A and 7B are TEM photos showing sections of the magnetic thin film shown in FIG. 6.
Figure 7B:
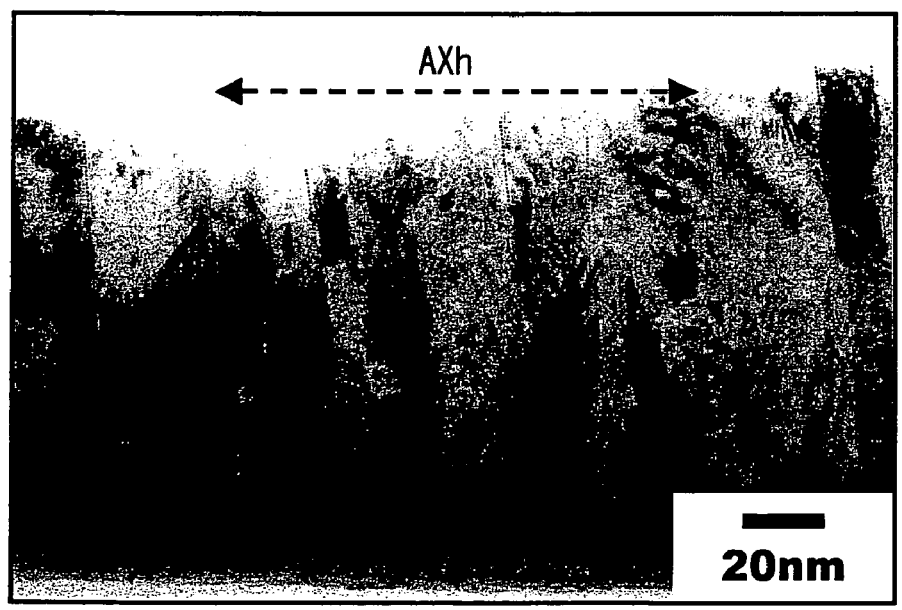
Figure 8:
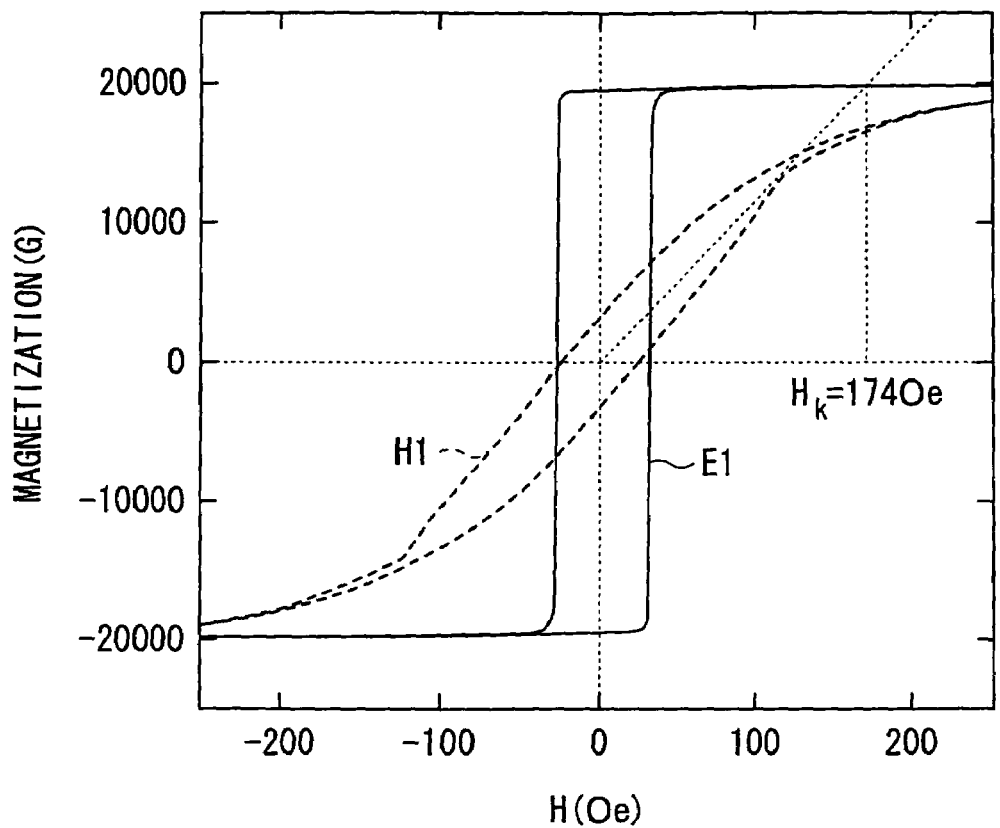
FIG. 8 is a magnetization curve of the magnetic thin film shown in FIG. 6.
Figure 9:
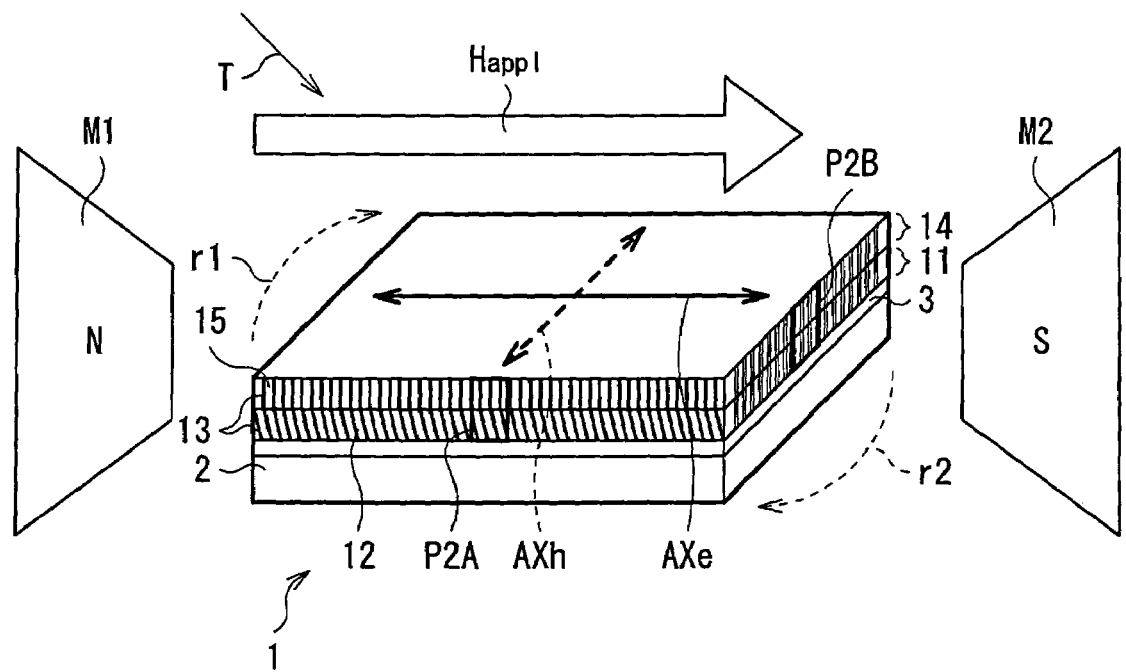
FIG. 9 is a schematic view for describing another example of the magnetic thin film formed by the forming method shown in FIG. 5.
Figure 10A:
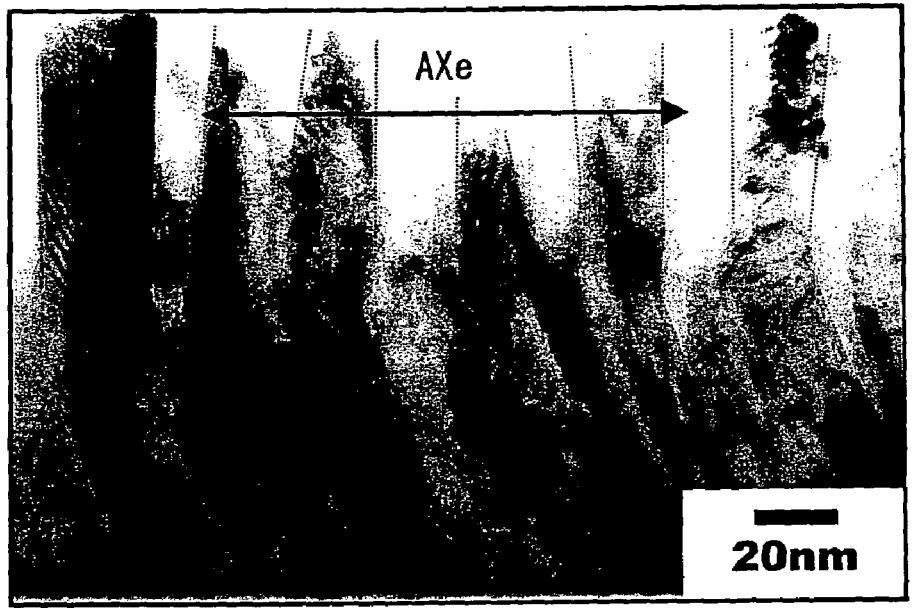
FIGS. 10A and 10B are TEM photos showing sections of the magnetic thin film shown in FIG. 9.
Figure 10B:
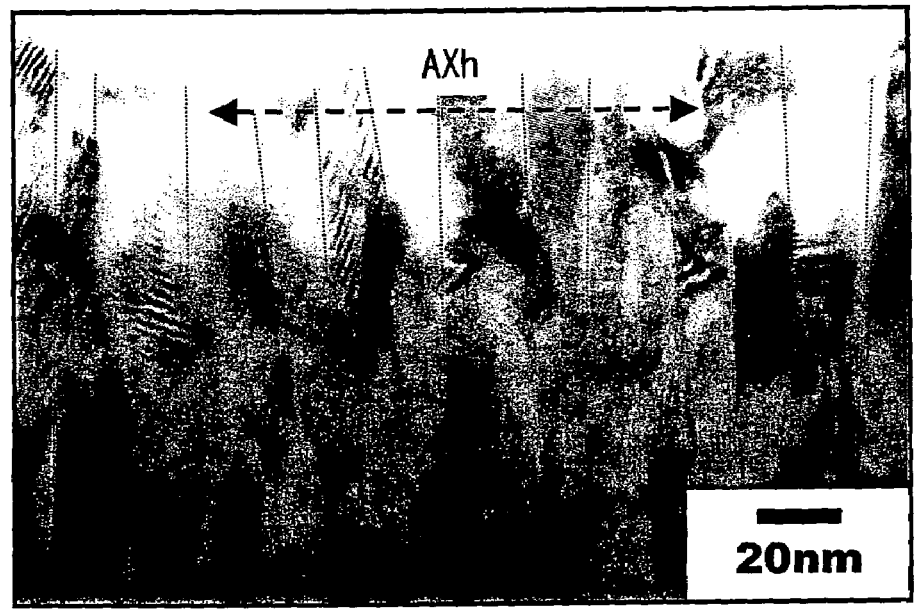
Figure 11:
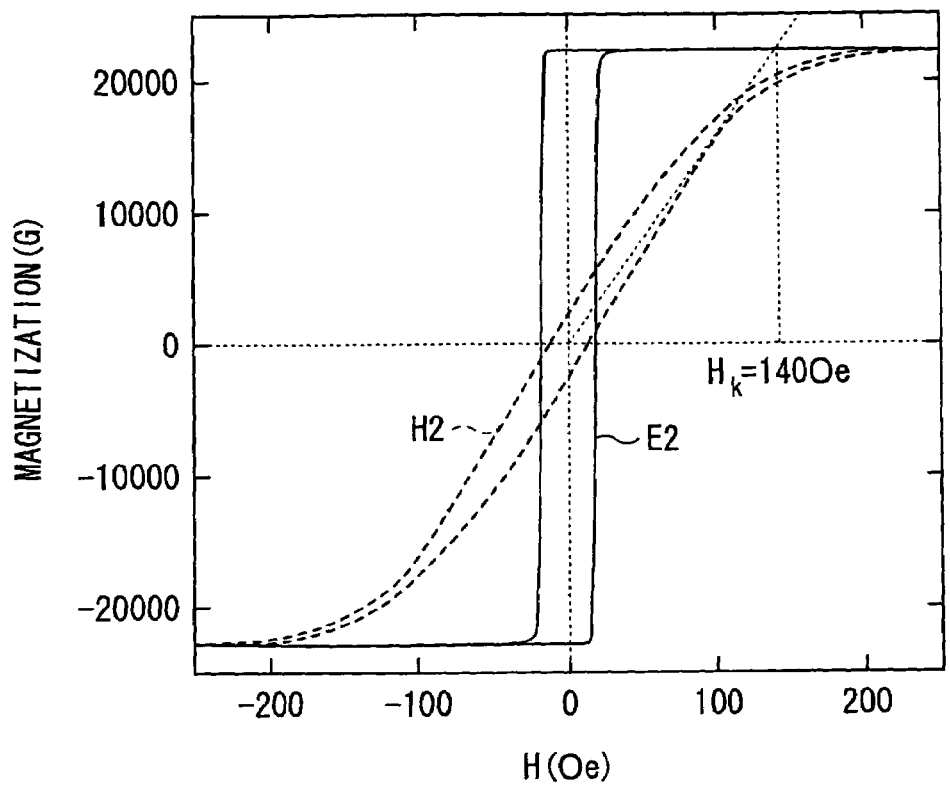
FIG. 11 is a magnetization curve of the magnetic thin film shown in FIG. 9.
Figure 12:
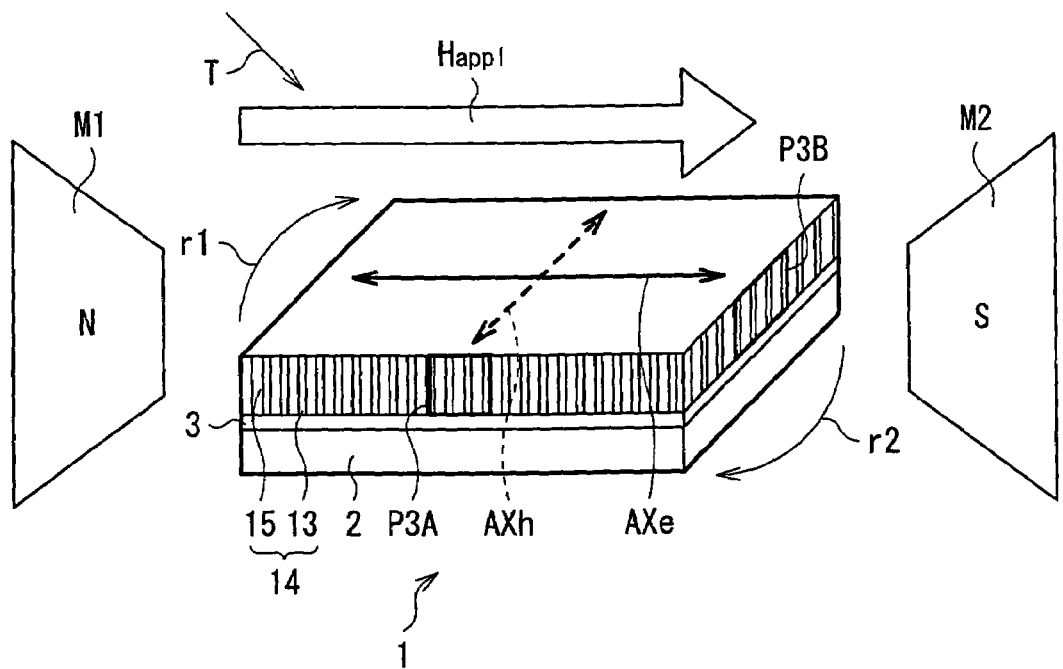
FIG. 12 is a schematic view for describing a magnetic thin film of a comparative example formed by the forming method shown in FIG. 5.
Figure 13A:
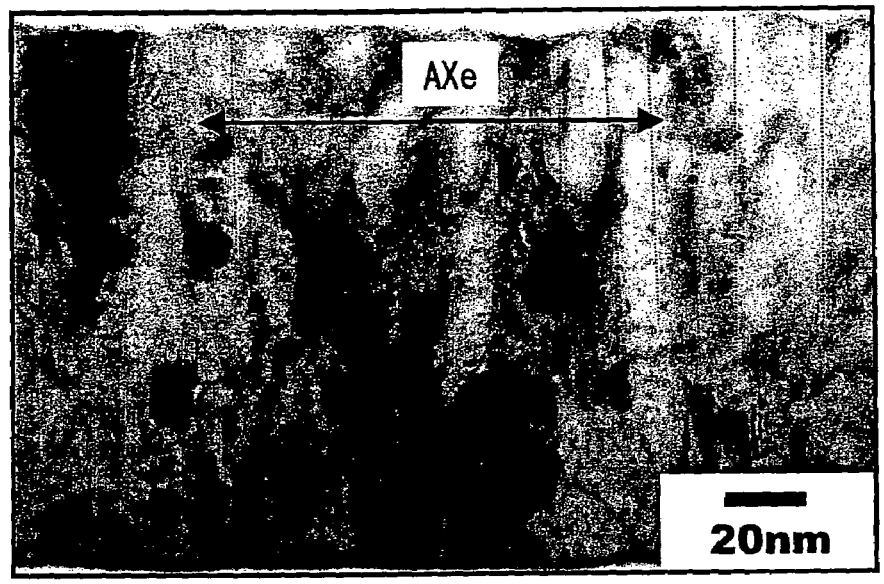
FIGS. 13A and 13B are TEM photos showing sections of the magnetic thin film shown in FIG. 12.
Figure 13B:
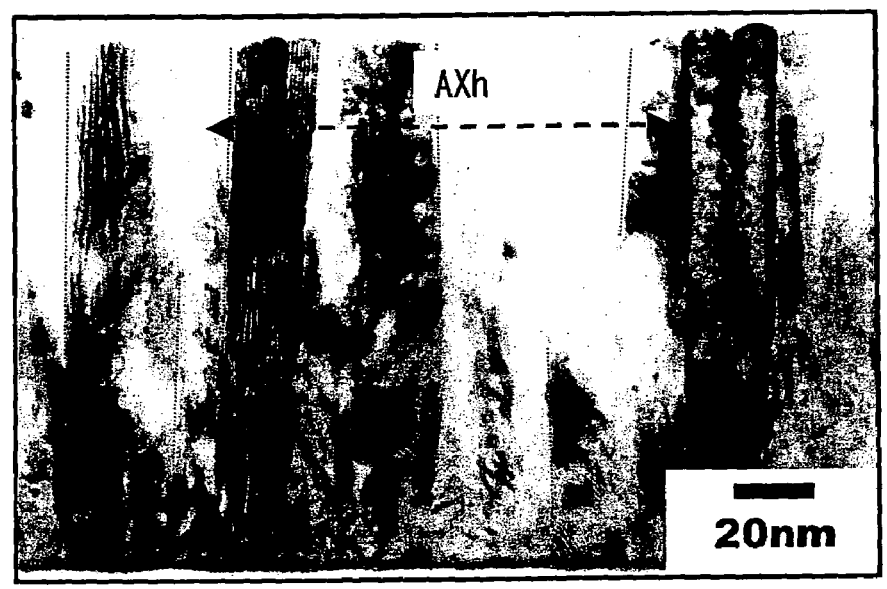
Figure 14:
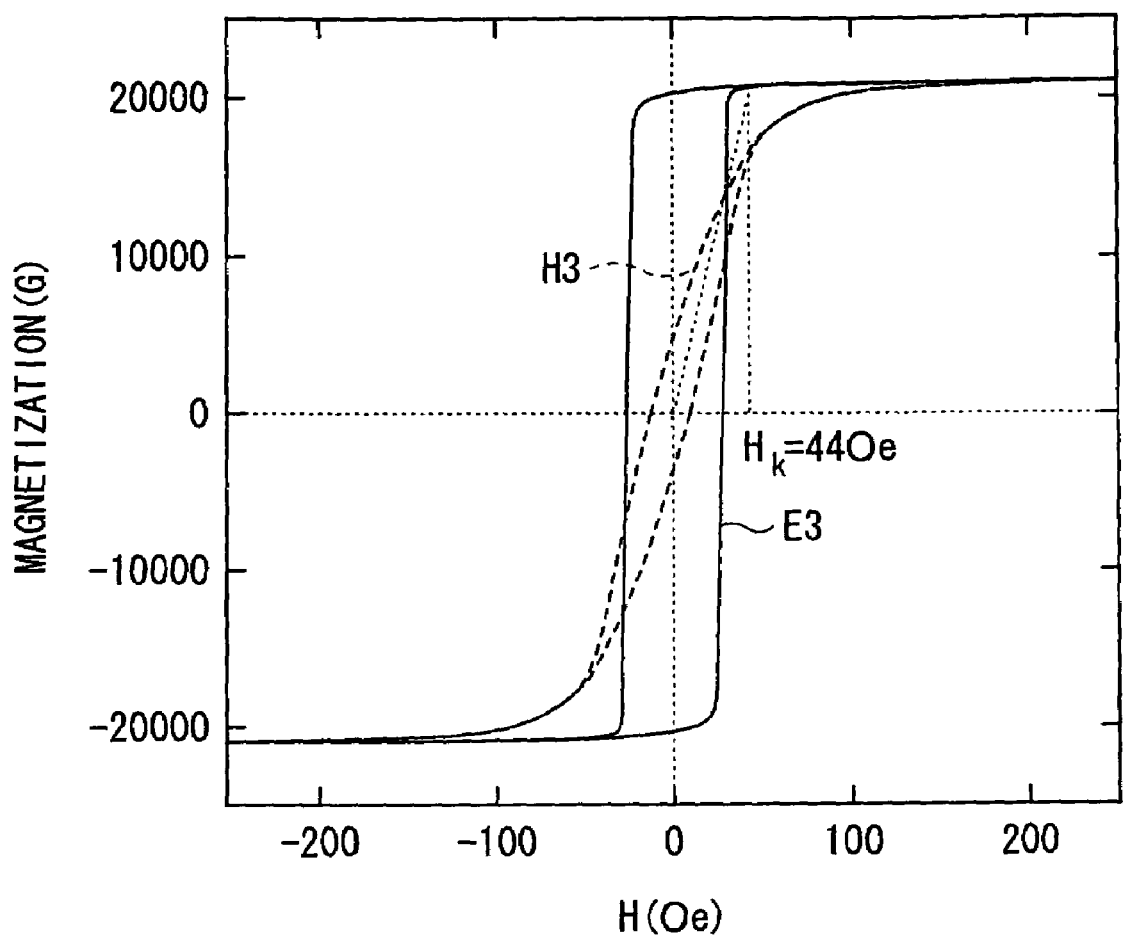
FIG. 14 is a magnetization curve of the magnetic thin film shown in FIG. 12.

Next, referring to FIGS. 6 through 14, the magnetic properties of the magnetic thin film 1 formed in this manner will be described below. FIGS. 6 through 8 show the magnetic properties in the case where only the obliquely-grown magnetic layer 11 is formed as the magnetic layer, and FIGS. 9 through 11 shows the magnetic properties in the case where the obliquely-grown magnetic layer 11 and the vertically grown magnetic layer 14 are formed as the magnetic layer. Moreover, FIGS. 12 through 14 shows the magnetic properties in the case where only the vertically grown magnetic layer 14 is formed as the magnetic layer as a comparative example. Further, FIGS. 6, 9 and 12 schematically show the states where the magnetic thin film 1 is formed in the above cases, and FIGS. 7A, 7B, 10A, 10B, 13A and 13B show transmission electro microscope (TEM) images showing sections of the magnetic thin films 1 in the above cases, and FIGS. 8, 11 and 14 show magnetization curves of the magnetic thin films 1 in the above cases. The thickness of the whole magnetic layer including the vertically grown magnetic layer 14 and the obliquely-grown magnetic layer 11 is set to be the same in each case.

In the case where the magnetic layer includes only the obliquely-grown magnetic layer 11, the obliquely-grown magnetic layer 11 is formed through fixing the substrate 2 as described above, and the obliquely-grown magnetic body 12 is grown along the direction of the applied magnetic field Happl (refer to FIG. 6). Moreover, when the TEM images (refer to FIGS. 7A and 7B) of sections (portions indicated by symbols P1A and P1B in FIG. 6) of the obliquely-grown magnetic layer 11 taken along the easy magnetization axis Axe and the hard magnetization axis AXh are viewed, it is found out that while the obliquely-grown magnetic body 12 is actually grown along the easy magnetization axis Axe (refer to FIG. 7A), a magnetic body is grown in a vertical direction in a direction along the hard magnetization axis AXh (refer to FIG. 7B). Moreover, it is found out that the forms (gradients) of a magnetization curve in a direction along the easy magnetization axis Axe (a magnetization curve E1 in FIG. 8) and a magnetization curve in a direction along the hard magnetization axis AXh (a magnetization curve H1 in FIG. 8) are largely different, and a high value, that is, the anisotropic magnetic field Hk=$174\times10^3/4\pi$ [A/m] (=174 Oe) is shown. The anisotropic magnetic field Hk is calculated by the value of a magnetic field H at an intersection point of a tangent to the magnetization curve H1 in a direction along the hard magnetization axis AXh and the saturation magnetization of the magnetization curve E1 in a direction along the easy magnetization axis Axe.

When the magnetic layer includes the obliquely-grown magnetic layer 11 and the vertically grown magnetic layer 14, the obliquely-grown magnetic layer 11 and the vertically grown magnetic layer 14 are formed by fixing or rotating the substrate 2 (in a direction shown by the arrows r1 and r2 in FIG. 9) as described above. It is found out that in the vertically grown magnetic layer 14, the vertically grown magnetic body 15 is grown in a vertical direction with respect to the substrate 2 in both directions along the easy magnetization axis Axe and the hard magnetization axis AXh, and in the obliquely-grown magnetic layer 11, the obliquely-grown magnetic body 12 is grown along the easy magnetization axis Axe (refer to FIGS. 9, 10A and 10B). Moreover, it is found out that there is a difference between the gradient of a magnetization curve E2 in a direction along the easy magnetization axis Axe and the gradient of a magnetization curve H2 in a direction along the hard magnetization axis AXh, and even though the anisotropic magnetic field Hk is slightly smaller than that in the above-described case, the anisotropic magnetic field Hk is $140\times10^3/4\pi$ [A/m] (=140 Oe) (refer to FIG. 11).

On the other hand, in the case where the magnetic layer includes only the vertically grown magnetic layer 14, the vertically grown magnetic layer 14 is formed through rotating the substrate 2 (in a direction shown by the arrows r1 and R2 in FIG. 12) as described above, and it is found out that the vertically grown magnetic body 15 is grown in a vertical direction with respect to the substrate 2 (refer to FIGS. 12, 13A and 13B). Moreover, a difference between the gradient of a magnetization curve E3 in a direction along the easy magnetization axis Axe and the gradient of a magnetization curve H3 in a direction along the hard magnetization axis AXh is smaller than those in the above two cases in which the obliquely-grown magnetic layer 11 is included as the magnetic layer, and the anisotropic magnetic field Hk is reduced ($44\times10^3/4\pi$ [A/m] (=44 Oe)) (refer to FIG. 14).

Figure 15:
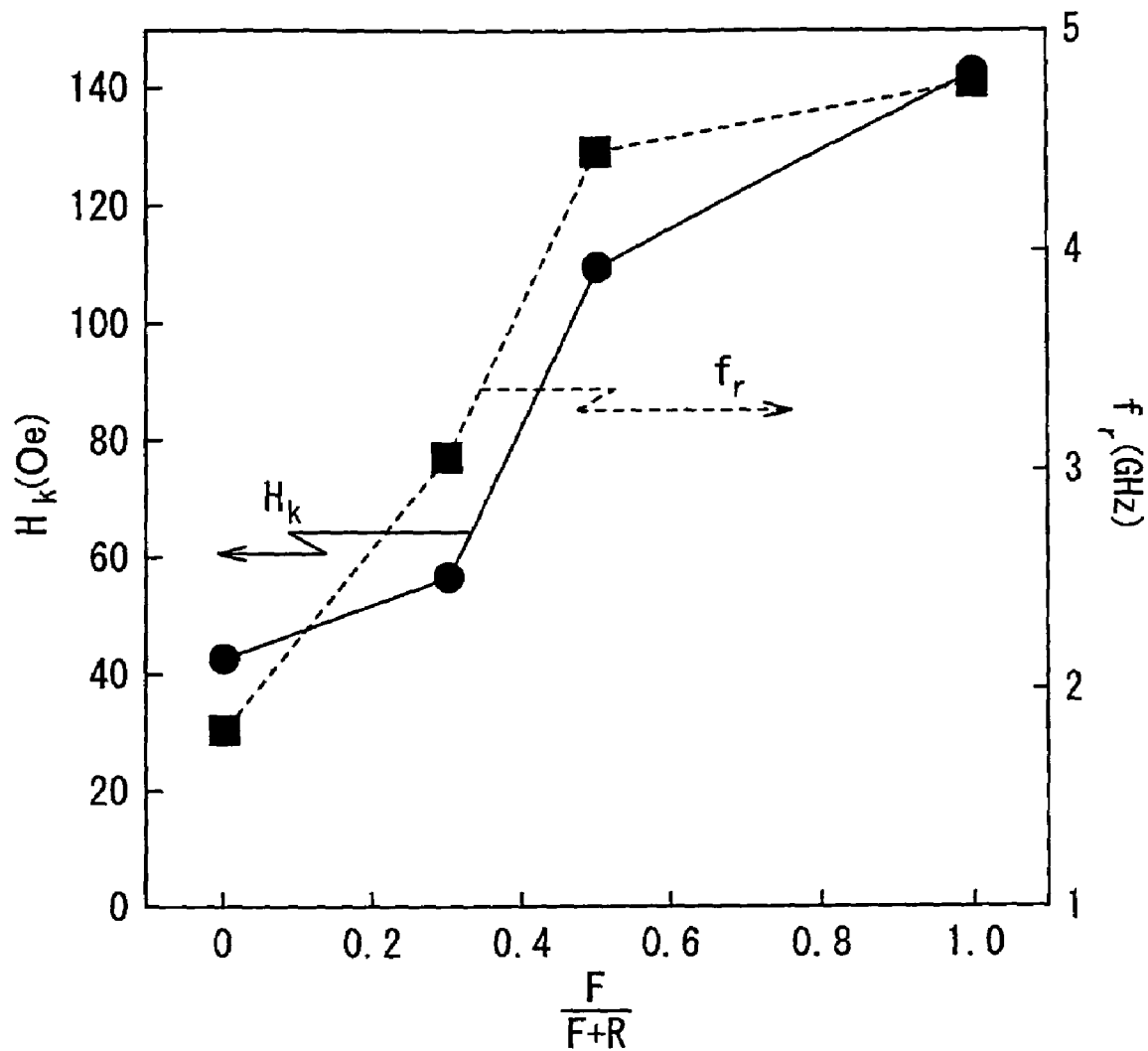
FIG. 15 is a plot showing a relationship between the resonant frequency and the anisotropic magnetic field of the magnetic thin film formed by the forming method shown in FIG. 5 and the thickness ratio of an obliquely-grown magnetic layer.

FIG. 15 shows a relationship between the resonant frequency fr and the anisotropic magnetic field Hk of the magnetic thin film 1 and the ratio of the thickness of the obliquely-grown magnetic layer 11 (=F/(F+R)) in these three cases. In this case, F/(F+R) as the ratio of the thickness of the obliquely-grown magnetic layer 11 shows a ratio of the thickness of the obliquely-grown magnetic layer 11 in the thickness of the whole magnetic layer including the obliquely-grown magnetic layer 11 and the vertically grown magnetic layer 14, and as described above, F/(F+R) is determined by a ratio between the duration of fixing the substrate 2 (Fix) and the duration of rotating the substrate 2 (Rotation) at the time of forming the magnetic layer. When the value of F/(F+R) is large, it means that the ratio of the thickness of the obliquely-grown magnetic layer 11 is large, and when the value is small, it means that the ratio of the thickness of the vertically grown magnetic layer 14 is large. Moreover, the resonant frequency fr is calculated by the above-described formula (1) on the basis of the anisotropic magnetic field Hk.

Thus, according to FIG. 15, it is found out that as the value of F/(F+R) increases, that is, as the ratio of the thickness of the obliquely-grown magnetic layer 11 increases, the values of the anisotropic magnetic field Hk and the resonant frequency fr increase. Therefore, it is found out that when the ratio of the thickness of the obliquely-grown magnetic layer 11 is changed, these values increase, and the high-frequency characteristics of the magnetic thin film 1 are improved. Moreover, it is found out that when the duration of fixing the substrate 2 and the duration of rotating the substrate 2 are adjusted at the time of forming the magnetic layer, these values can be freely controlled, and the high-frequency characteristics of the magnetic thin film 1 can be controlled.

Figure 16:
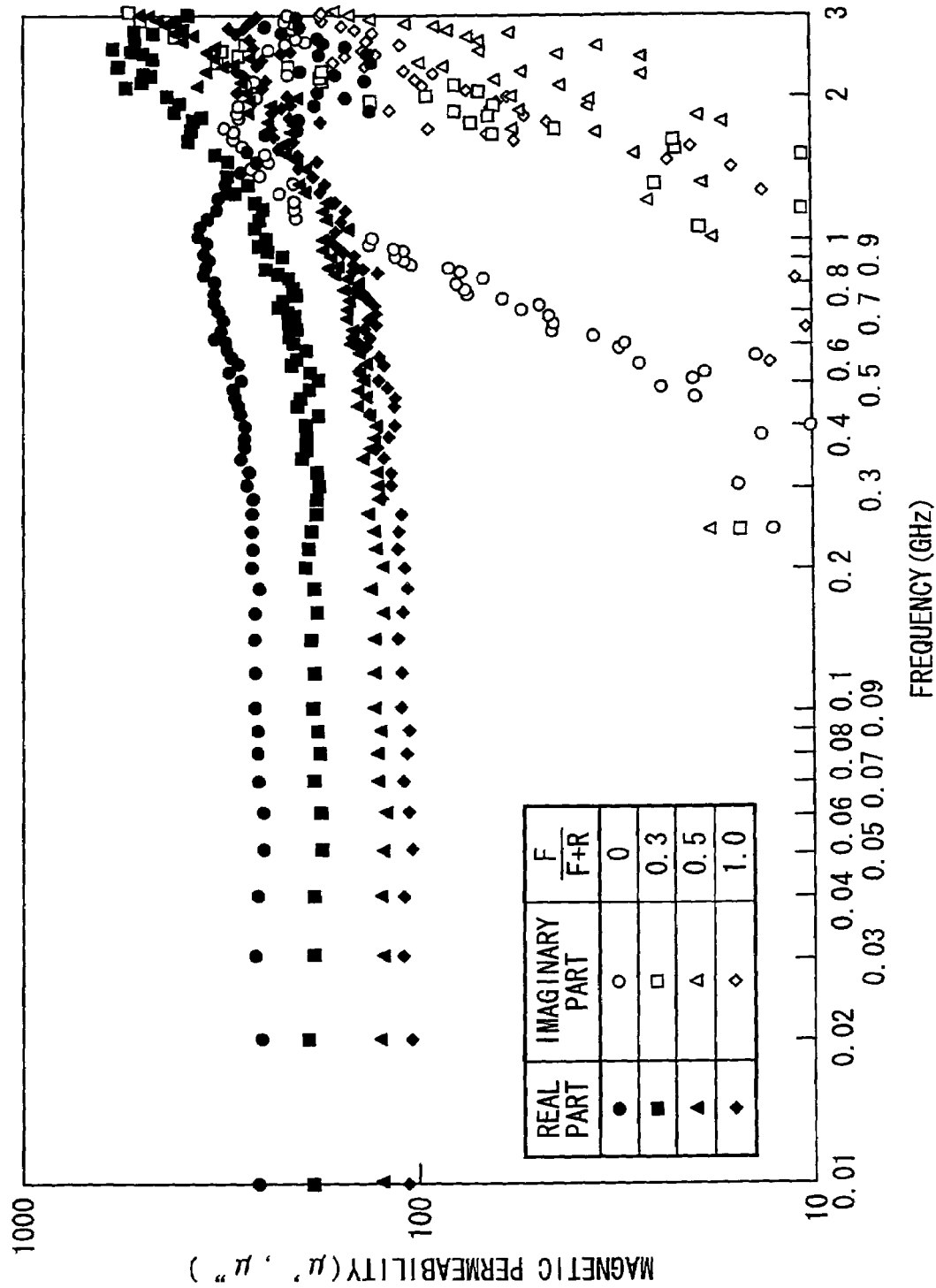
FIG. 16 is a plot showing frequency characteristics of magnetic permeability in the magnetic thin film formed by the forming method shown in FIG. 5.

The above resonant frequency fr is calculated by the formula (1); however, the resonant frequency fr can be measured from the frequency characteristics of magnetic permeability in the magnetic thin film shown in FIG. 16. The horizontal axis shows frequency [GHz], and the vertical axis shows the magnetic permeability of the magnetic thin film (a real part $\mu'$, an imaginary part $\mu''$). A black point in the drawing shows a real part $\mu'$ of magnetic permeability, and a white point shows an imaginary part $\mu''$ of magnetic permeability. At this time, the resonant frequency fr is determined by a frequency when the imaginary part $\mu''$ of the magnetic permeability is at its peak.

Thus, in FIG. 16, some of the peak values of the imaginary parts $\mu''$ of the magnetic permeability exceed 3 GHz which is a measuring limit; however, it is found out that as the value of F/(F+R) increases, that is, the ratio of the thickness of the obliquely-grown magnetic layer 11 increases, there is a tendency that the peak value of the imaginary part μ" of the magnetic permeability is shifted to a high-frequency side, and the resonant frequency fr increases. Therefore, it is found out that the same result shown in FIG. 15 is obtained.

As described above, in the embodiment, the planar coil 4 and the magnetic thin film 1 are disposed on the substrate 2 so as to form an inductor between the connection terminals J1 and J2, and the obliquely-grown magnetic layer 11 is crystal-grown in a columnar form in an oblique direction with respect to the surface of the substrate 2 (the obliquely-grown magnetic body 12), and in the obliquely-grown magnetic layer 11, in order to make the obliquely-grown magnetic body 12 exhibit soft magnetism, the insulator 13 is mixed into the obliquely-grown magnetic body 12, so the obliquely-grown magnetic layer 11 shows in-plane magnetocrystalline anisotropy, and the in-plane magnetocrystalline anisotropy is increased, thereby the anisotropic magnetic field can be increased. Therefore, the anisotropic magnetic field can be changed only by the crystal growth direction of the obliquely-grown magnetic layer 11 without changing the composition of the magnetic thin film 1, so the anisotropic magnetic field can be increased without reducing the saturation magnetization, and the resonant frequency of the magnetic thin film 1 can be improved. Thus, a magnetic thin film with superior high-frequency characteristics can be obtained, and an inductor with superior high-frequency characteristics can be obtained.

Figure 17:
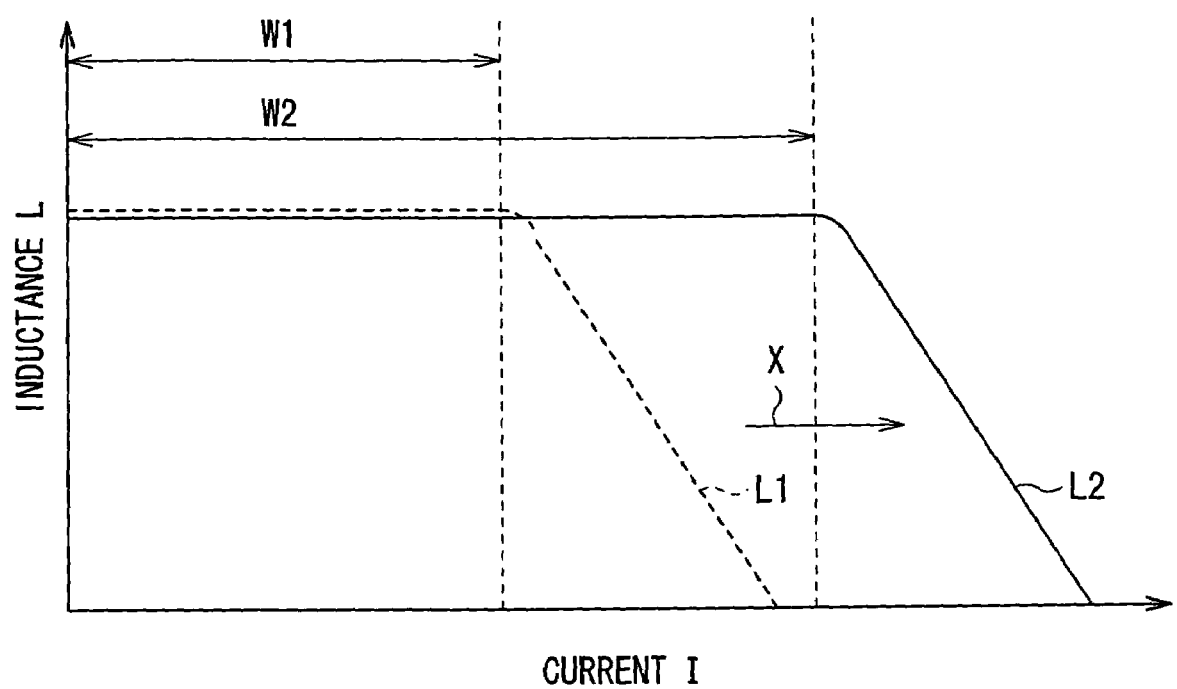
FIG. 17 is a schematic view for describing a relationship between a current flowing through a planar coil and an inductance.

Moreover, the anisotropic magnetic field of the magnetic thin film 1 can be increased, so, for example, as shown in FIG. 17, in a relationship between a current flowing through the planar coil 4 and the inductance L of the inductor 10, compared to the case where the inductor includes a magnetic thin film including only the vertically grown magnetic layer 14 (L1 in FIG. 17), in the embodiment in which the inductor includes the magnetic thin film 1 including the obliquely-grown magnetic layer 11 (L2 in FIG. 17), a reduction in the inductance L in a large current region shown by an arrow X can be prevented. Therefore, DC bias characteristics in the inductor can be improved, and as shown by the symbols W1 and W2, a larger current can flow through the planar coil 4.

As the insulator 13 is mixed into the obliquely-grown magnetic body 12, the resistivity of the obliquely-grown magnetic layer 11 is increased, so a current loss can be prevented, and the high-frequency characteristics of the magnetic thin film 1 can be improved.

In the case where the vertically grown magnetic layer 14 is included, at the time of forming the magnetic layer, the monocrystallization of the obliquely-grown magnetic body 12 can be prevented, and the anisotropic magnetic field can be further increased, and the high-frequency characteristics of the magnetic thin film 1 can be further improved.

The ratio between the thickness d1 of the obliquely-grown magnetic layer 11 and the thickness d2 of the vertically grown magnetic layer 14 can be freely set by the duration of fixing the substrate 2 and the duration of rotating the substrate 2 at the time of forming the magnetic layer, so the magnitude of the anisotropic magnetic field and by extension, the magnitude of the resonant frequency can be freely controlled by the ratio between the thicknesses.

Effects of increasing and controlling in-plane magnetic anisotropy by such an obliquely-grown magnetic layer 11 can be obtained in an as-depo. state just after film formation, so it is not necessary to perform heat treatment, which is generally performed, in a magnetic field after film formation, and the inductor 10 can be applied to an application which is difficult to be treated with heat.

As shown in FIGS. 1A and 1B, in the inductor 10 according to the embodiment, the case where the magnetic thin film 1 is disposed between the substrate 2 and the planar coil 4 is described; however, the magnetic thin film 1 may be disposed on an opposite side viewed from the planar coil 4, that is, on the insulating layer 3B. In other words, the magnetic thin film 1 may be disposed on either side of the planar coil 4, and also in this case, the same effects can be obtained.

Second Embodiment

Next, a second embodiment of the invention will be described below.

Figure 18:
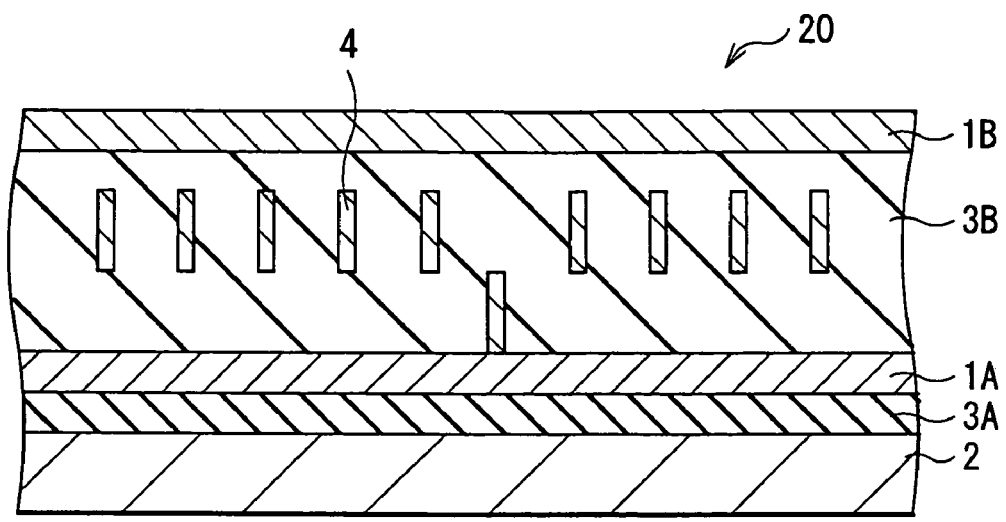
FIG. 18 is a schematic sectional view of a magnetic device according to a second embodiment of the invention.

FIG. 18 shows a sectional view of an inductor 20 as a magnetic device according to the embodiment. In the drawing, like components are donated by like numerals as of the inductor 10 (refer to FIGS. 1A and 1B) according to the first embodiment, and will not be further described.

In the inductor 20 according to the embodiment, a magnetic thin film is further formed on the insulating layer 3B in the inductor 10 according to the first embodiment. In other words, the inductor 20 has a structure in which the planar coil 4 is sandwiched between a pair of magnetic thin films 1A and 1B with the insulating layer 3B in between. Other structures of the inductor 20 and a method of manufacturing the inductor 20 are the same as in the case of the inductor 10 according to the first embodiment. In the inductor 20 with such a structure according to the embodiment, in addition to the effects in the inductor 10 according to the first embodiment, the effective area of the magnetic thin film 1 can be increased, and a larger inductance can be obtained.

Figure 19:
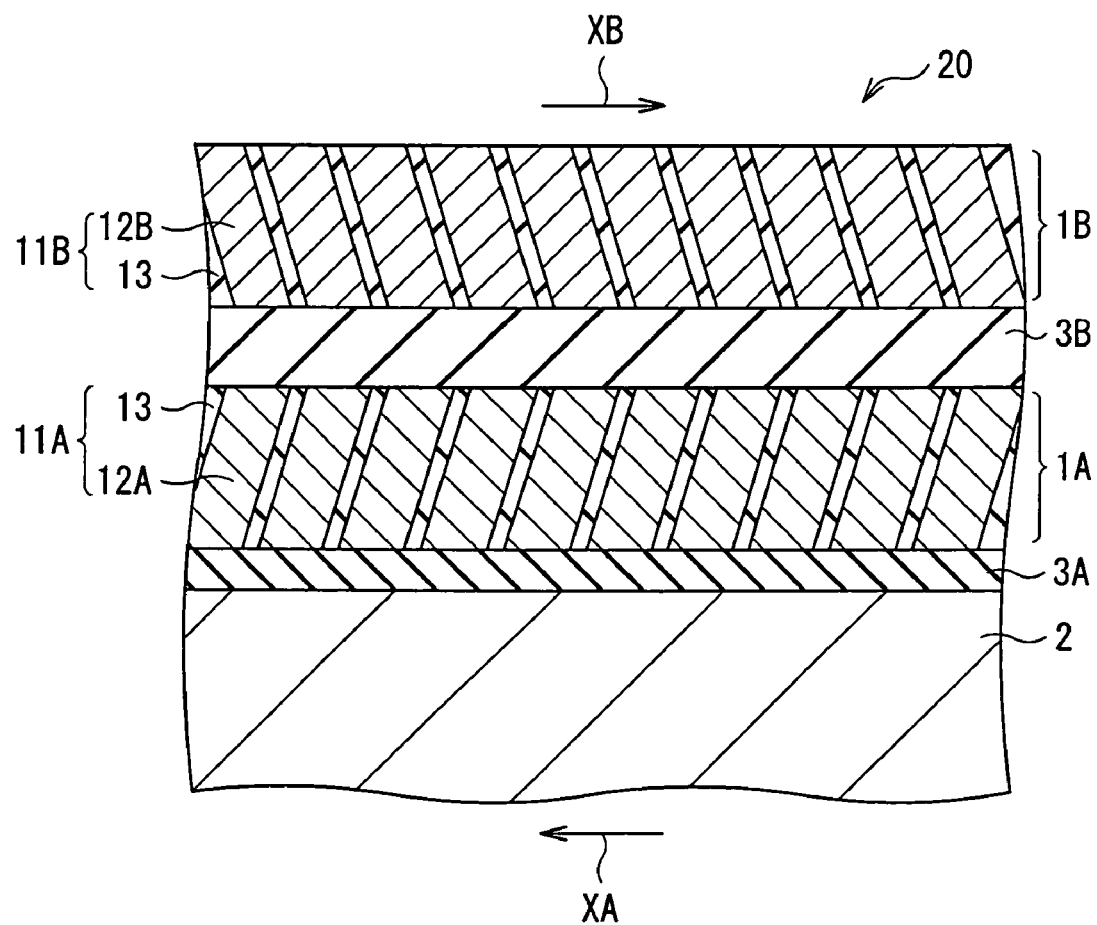
FIG. 19 is a schematic view for describing an example of a relationship between crystal growth directions.

In the inductor 20 according to the embodiment, for example, as shown in FIG. 19, a pair of obliquely-grown magnetic layers 11A and 11B included in a pair of magnetic thin films 1A and 1B, respectively can be disposed so as to be plane symmetric to each other with reference to a central surface of a coil in a section vertical to a laminate surface (and a coil extending surface; the same holds true in the following). In the case where the inductor 20 has such a structure, the crystal growth direction in the obliquely-grown magnetic layer 11A is oriented in a specific direction, and the anisotropic magnetic field Hk can be increased.

Figure 20:
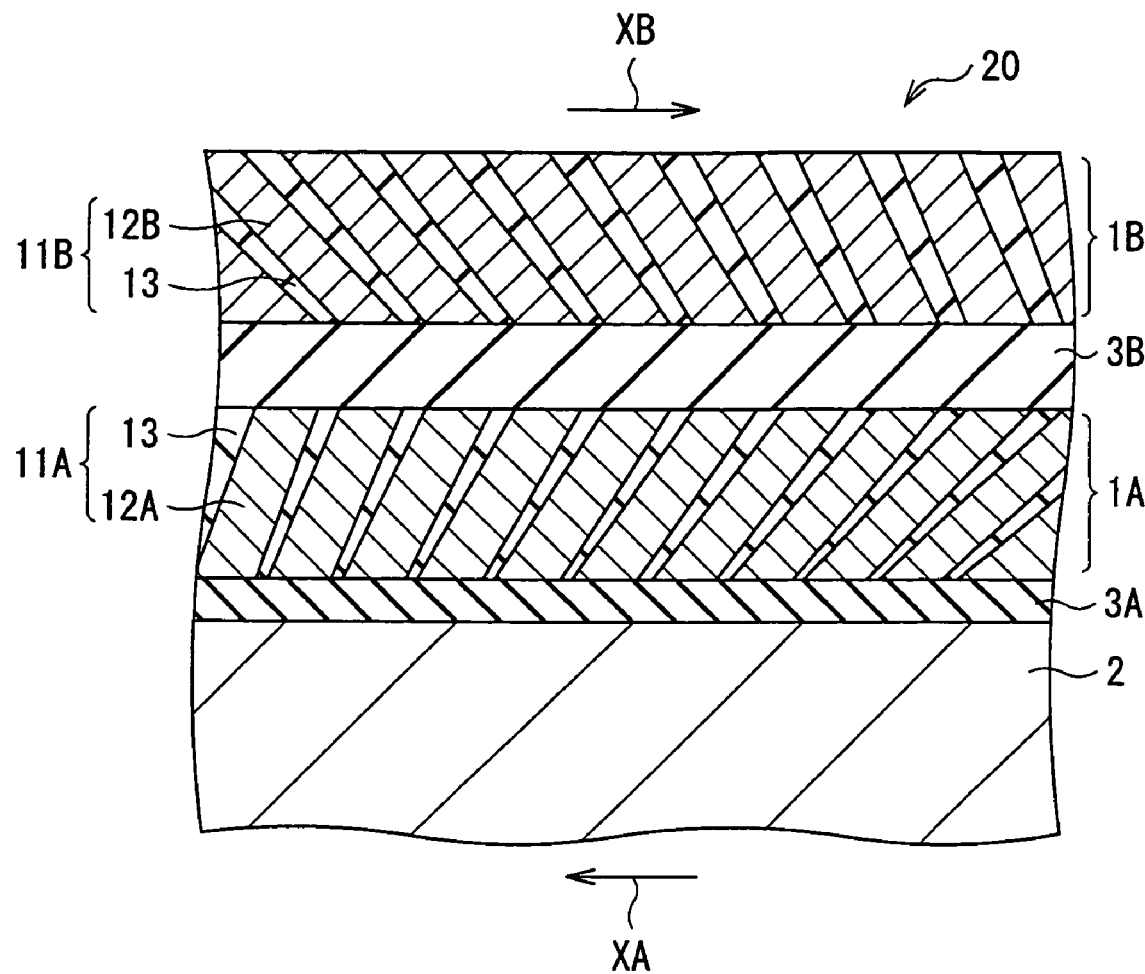
FIG. 20 is a schematic view for describing an example of a relationship between crystal growth directions.

Moreover, for example, as shown in FIG. 20, it is preferable that in the pair of obliquely-grown magnetic layers 11A and 11B, while an angle which the crystal growth direction in the obliquely-grown magnetic layer 11A forms with the laminate surface is gradually increased from one end of the substrate 2 to the other end of the substrate 2 (for example, in an arrow XA direction in FIG. 19), an angle which the crystal growth direction in the obliquely-grown magnetic layer 11B forms with the laminate surface is gradually increased from the other end of the substrate 2 to one end of the substrate 2 (for example, in an arrow XB direction) contrary to the obliquely-grown magnetic layer 11B. Thus, in order for the inductor 20 to have a structure in which the angles which the crystal growth directions in the pair of obliquely-grown magnetic layers 11A and 11B form the laminate surface change inversely with each other from one end of the substrate 2 to the other end of the substrate 2, for example, after forming the obliquely-grown magnetic layer 11A, the substrate 2 is rotated 180° in an in-plane direction (including the case where the substrate 2 rotates on its axis and the case where the substrate 2 revolves), and then the obliquely-grown magnetic layer 11B may be formed. It is because when the obliquely-grown magnetic layers 11 are formed, as described above, the magnetic materials are applied to the substrate 2 in the oblique direction T. In the case where inductor 20 has such a structure, variations in the angles with respect to a position on the substrate 2 (and the coil extending surface) can be reduced, so manufacturing yield can be improved, and the manufacturing cost can be reduced.

Figure 21:
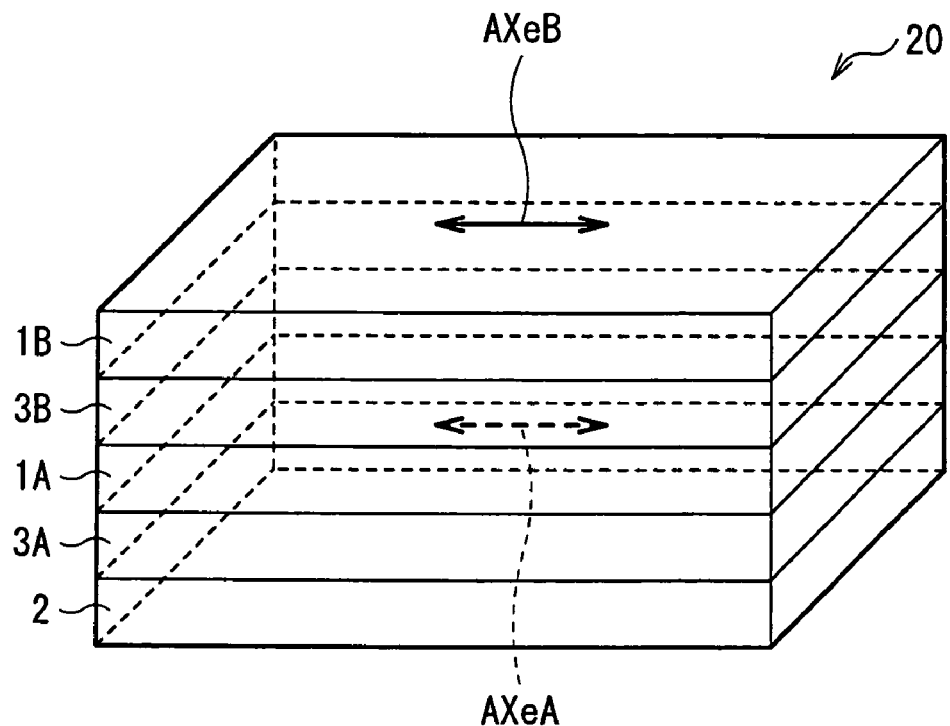
FIG. 21 is a schematic view for describing an example of a relationship between laminate in-plane components of crystal growth directions.

Moreover, for example, as shown in FIG. 21, the inductor 20 may be formed in a rectangular shape, and laminate in-plane components of the crystal growth directions in the pair of obliquely-grown magnetic layers 11A and 11B may be controlled so that the easy magnetization axes of the obliquely-grown magnetic layers 11A and 11B (indicated by arrows AxeA and AXeB in the drawing, respectively) match each other in a major axis direction. In the case where the inductor 20 has such a structure, the effective area of the magnetic layer in a high-frequency region can be increased, and even under the condition that a weak magnetic field is applied at the time of manufacturing, the easy magnetization axis Axe and the hard magnetization axis AXh can be provided.

Figure 22:
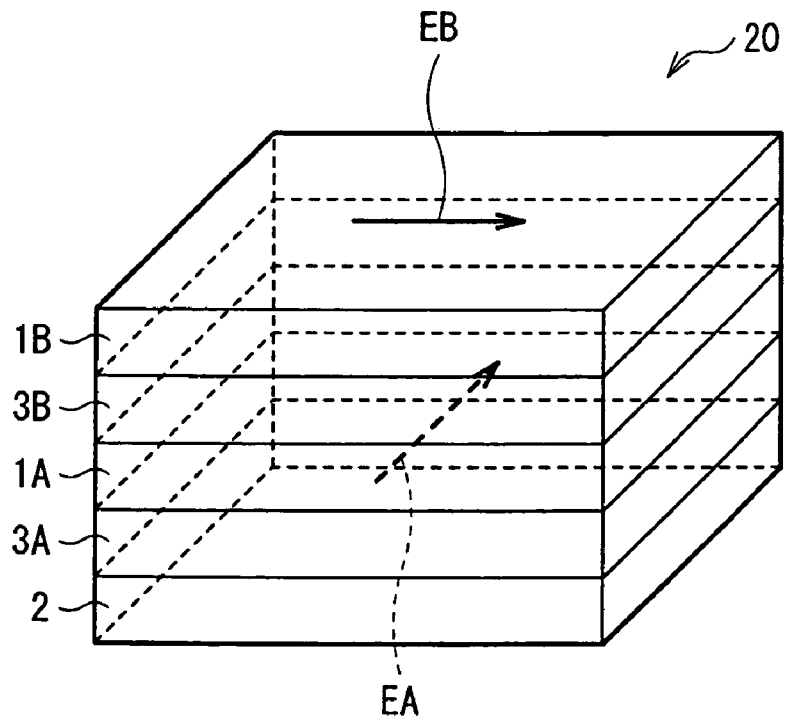
FIG. 22 is a schematic view for describing another example of a relationship between laminate in-plane components of crystal growth directions.

Moreover, for example, as shown in FIG. 22, the inductor 20 may have a structure in which laminate in-plane components (indicated by arrows EA and EB in the drawing) of the crystal growth directions in the pair of obliquely-grown magnetic layers 11A and 11B are substantially orthogonal to each other. In the case where the inductor 20 has such a structure, the anisotropic magnetic field can be reduced through canceling out in-plane magnetocrystalline anisotropies of the obliquely-grown magnetic layers 11, and a magnetic thin film which is used in a low-frequency band can be obtained. Moreover, when the anisotropic magnetic field is reduced, the magnetic permeability $\mu$ of the magnetic thin film can be increased (can be inversely proportional to the anisotropic magnetic field Hk).

Although the invention is described referring to the first embodiment and the second embodiment, the invention is not limited to them, and can be variously modified.

Figure 23:
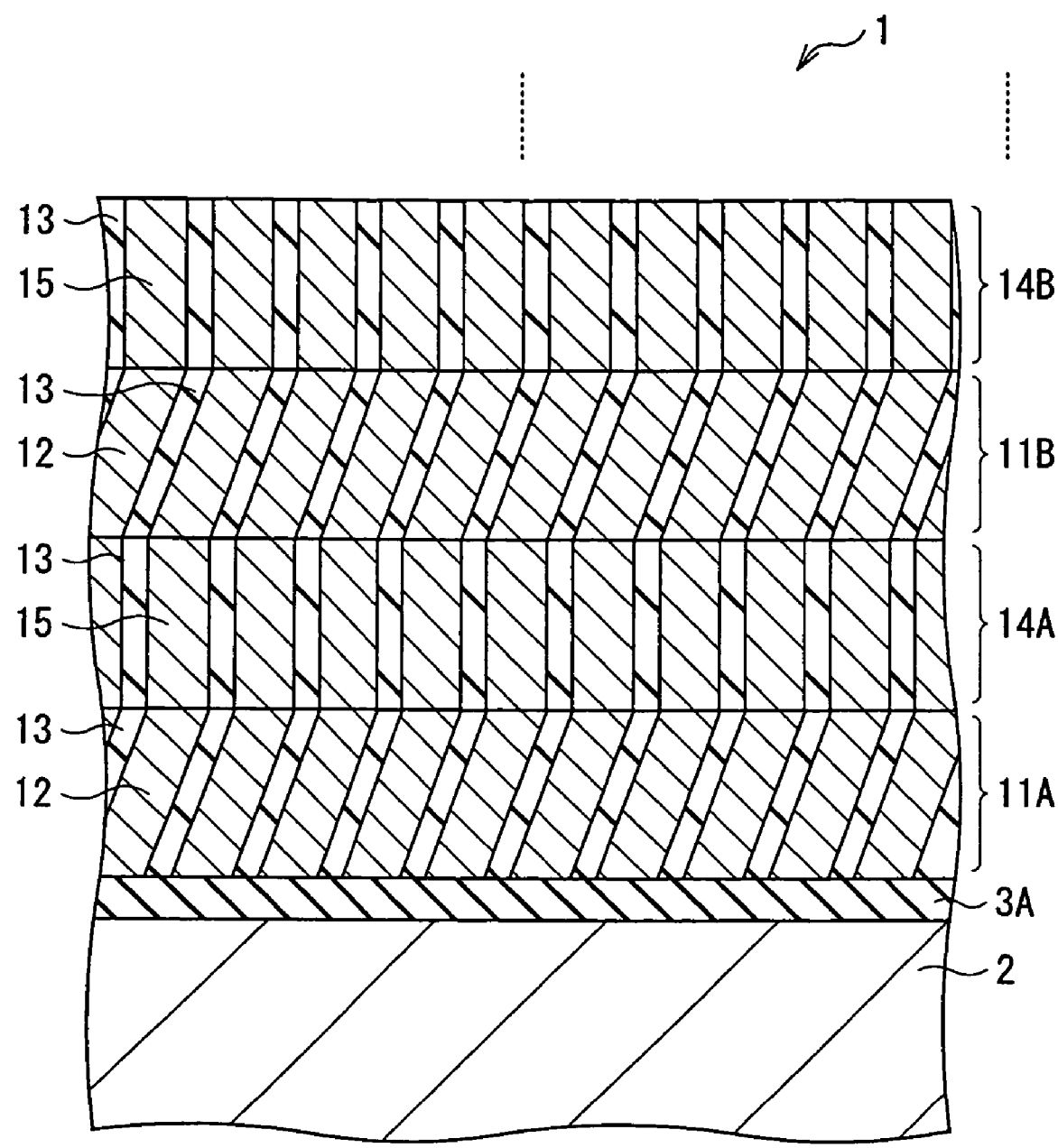
FIG. 23 is a schematic sectional view of an example in the case where a plurality of obliquely-grown magnetic layers and a plurality of vertically grown magnetic layers are laminated.

For example, in the above embodiments, the case where the magnetic layer in the magnetic thin film 1 includes only one obliquely-grown magnetic layer 11 (refer to FIGS. 2 and 6), or the case where the magnetic layer includes one obliquely-grown magnetic layer 11 and one vertically grown magnetic layer 14 (refer to FIGS. 4 and 9) are described; however, for example, as shown in FIG. 23, the magnetic layer may include a plurality of obliquely-grown magnetic layers 11 and a plurality of vertically grown magnetic layers 14 (obliquely-grown magnetic layers 11A, 11B, . . . , and vertically grown magnetic layers 14A, 14B, . . . ). Moreover, as described in the second embodiment (refer to FIG. 18), in the case where the magnetic thin film includes a pair of magnetic thin films 1A and 1B, at least one of the pair of magnetic thin films 1A and 1B may have a multilayer structure. Even in this case, the same effects as those in the above embodiment can be obtained.

Figure 24:
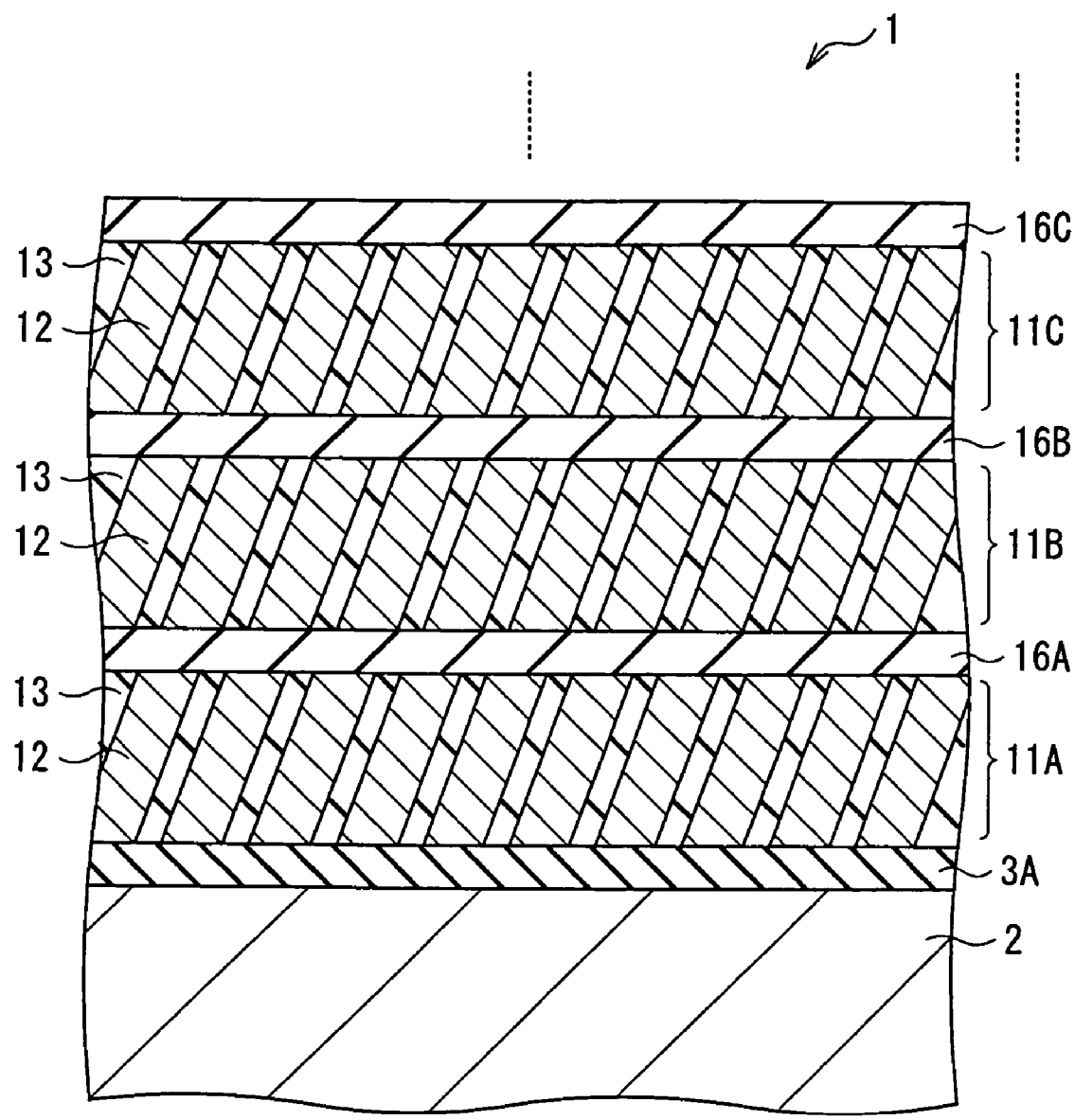
FIG. 24 is a schematic sectional view of an example in the case where an insulating layer is included in the magnetic thin film shown in FIG. 22.
Figure 25:
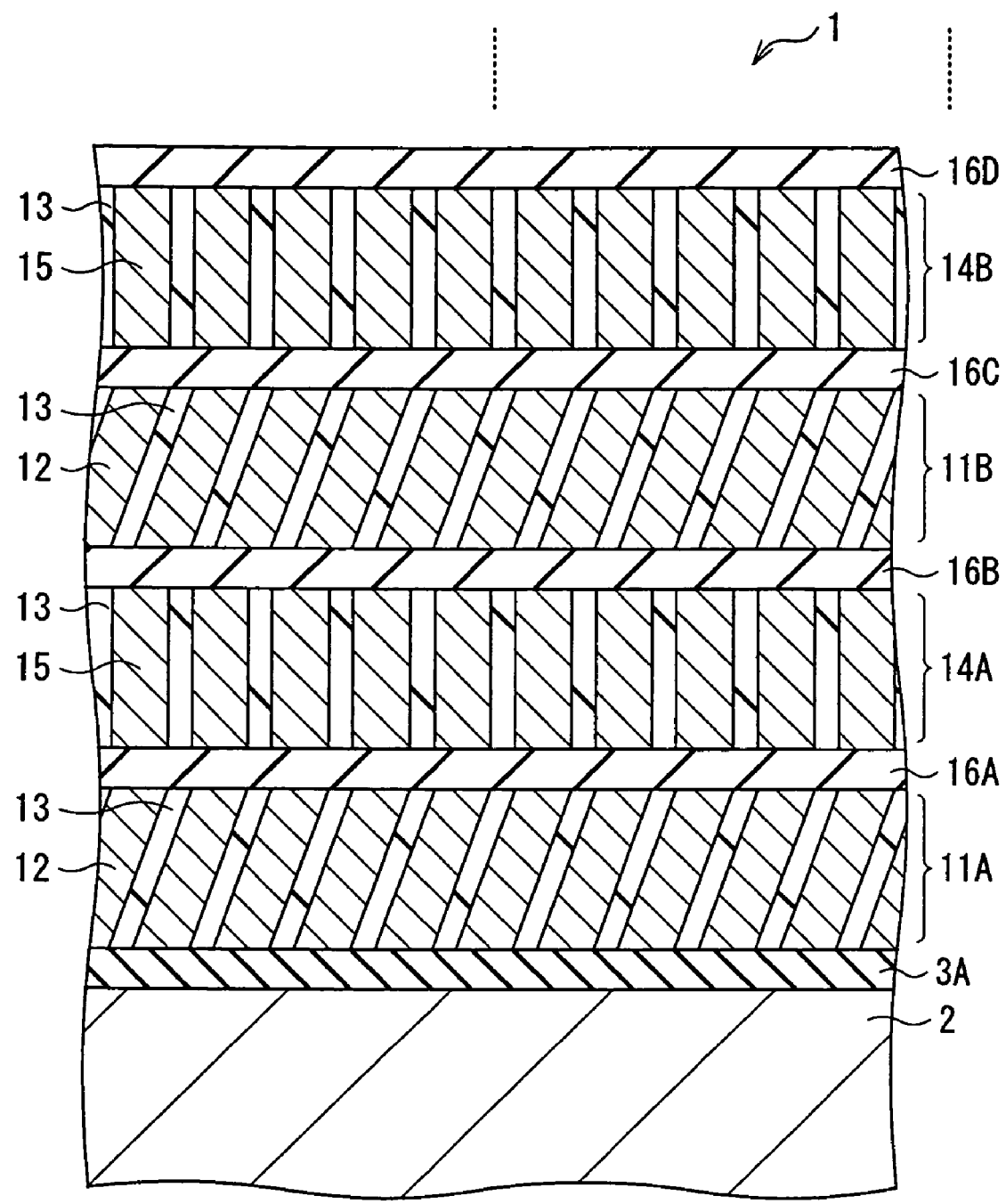
FIG. 25 is a schematic sectional view of an example in the case where an insulating layer is included in the magnetic thin film shown in FIG. 23.

In the above embodiments, the case where only the magnetic layer is included in the magnetic thin film 1 is described; however, for example, as shown in FIGS. 24 and 25, insulating layers 16A, 16B, 16C 16D, . . . made of, for example, an insulator such as $Al_2O_3$ may be disposed between a plurality of obliquely-grown magnetic layers 11A, 11B, . . . (refer to FIG. 24) or between the obliquely-grown magnetic layers 11 and the vertically grown magnetic layers 14 (refer to FIG. 25). In such a structure, in addition to the effects in the above embodiments, like the effects in the case where the vertically grown magnetic layer 14 is included, the monocrystallization of the obliquely-grown magnetic body 12 can be prevented so as to further increase the anisotropic magnetic field, and the resistivity of the magnetic thin film 1 can be further improved, and a current loss can be further prevented. Further, in the case where the magnetic thin film includes a pair of magnetic thin films 1A and 1B as described above, an insulating layer 16 may be disposed on at least one of the pair of magnetic thin films 1A and 1B.

Figure 26:
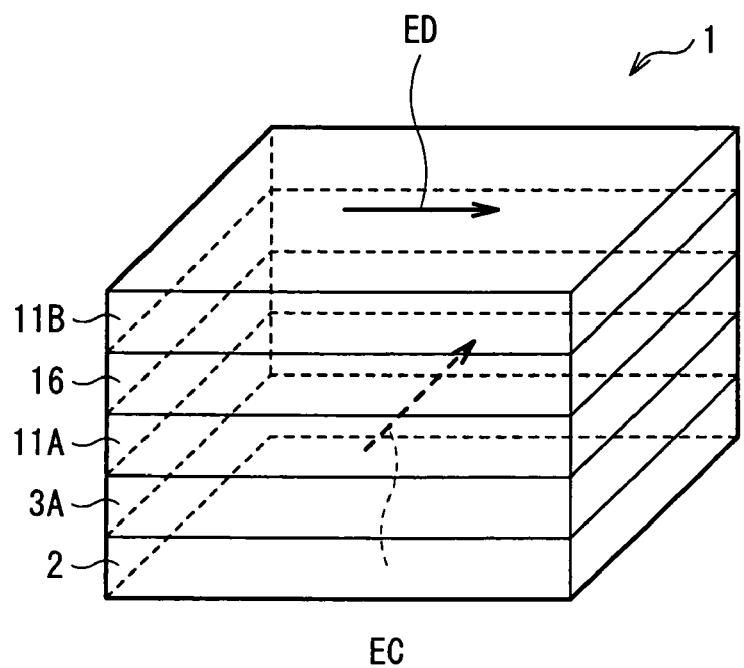
FIG. 26 is a schematic view for describing an example of a relationship between laminate in-plane components of crystal growth directions in adjacent obliquely-grown magnetic layers.

Moreover, as shown in FIGS. 23 through 25, in the case where a plurality of obliquely-grown magnetic layers 11 are included, for example, as shown in FIG. 26, laminate in-plane components of the crystal growth directions at least in adjacent obliquely-grown magnetic layers 11A and 11B (indicated by arrows EC and ED in the drawing, respectively) may be substantially orthogonal to each other. In such a structure, the anisotropic magnetic field can be reduced through canceling out the in-plane magnetocrystalline anisotropies of the obliquely-grown magnetic layers 11, and a magnetic thin film which is used in a low-frequency band can be obtained. Further, the magnetic permeability $\mu$ of the magnetic thin film can be increased (can be inversely proportional to the anisotropic magnetic field Hk) through reducing the anisotropic magnetic field. In FIG. 26, the insulating layer 16 is disposed between adjacent obliquely-grown magnetic layers 11A and 11B; however, the vertically grown magnetic layer 14 may be disposed, and the same effects can be obtained in this case.

Figure 27:
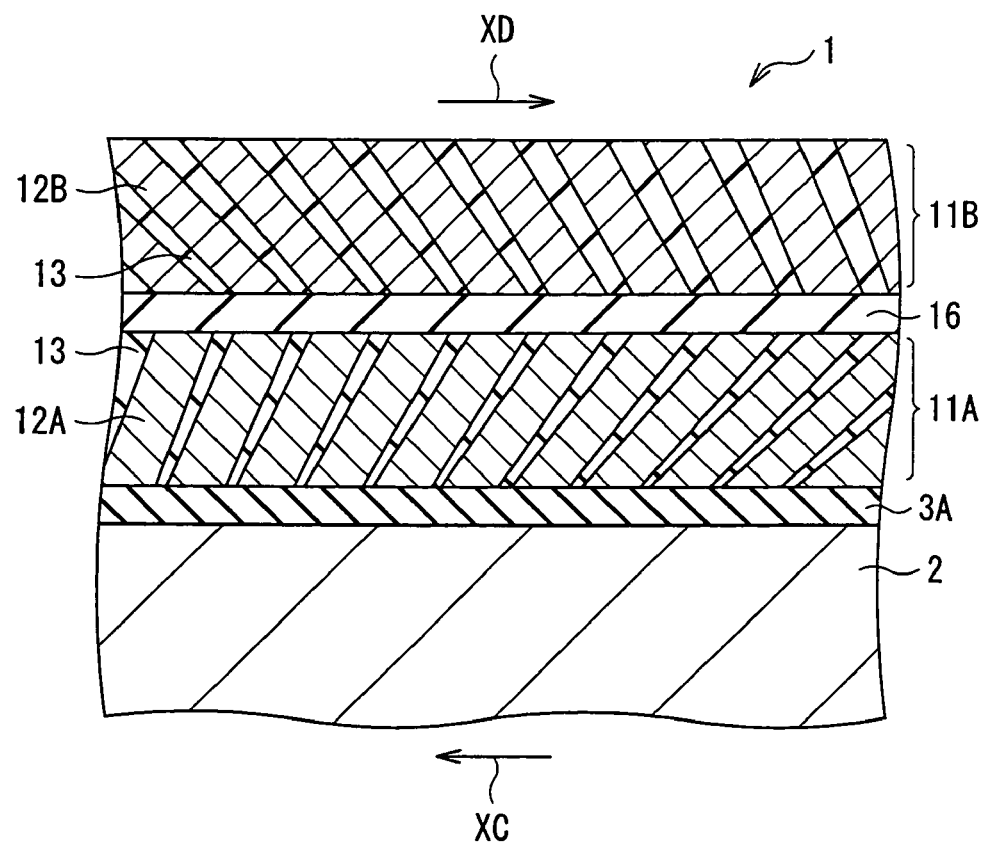
FIG. 27 is a schematic view for describing an example of a relationship between crystal growth directions in adjacent obliquely-grown magnetic layers.

In the case where a plurality of obliquely-grown magnetic layers 11 are included as described above, for example, as shown in FIG. 27, it is preferable that in a pair of adjacent obliquely-grown magnetic layers 11A and 11B, while an angle which the crystal growth direction in the obliquely-grown magnetic layer 11A forms with the laminate surface gradually increases from one end of the substrate 2 to the other end of the substrate 2 (for example, in an arrow XC direction in FIG. 27), an angle which the crystal growth direction in the obliquely-grown magnetic layer 11B forms with the laminate surface gradually increases from the other end of the substrate 2 to one end of the substrate 2 (for example, in an arrow XD direction in FIG. 27) contrary to the case of the obliquely-grown magnetic layer 11A. Thus, in order to have a structure in which angles which the crystal growth directions in the pair of adjacent obliquely-grown magnetic layers 11 form the laminate surface changes inversely with each other from one end of the substrate 2 to the other end of the substrate 2, for example, after forming the obliquely-grown magnetic layer 11A, the substrate 2 is rotated 180° in an in-plane direction (including the case where the substrate 2 rotates on its axis and the case where the substrate 2 revolves), and then the obliquely-grown magnetic layer 11B may be formed. It is because when the obliquely-grown magnetic layers 11 are formed, as described above, the magnetic materials are applied to the substrate 2 in the oblique direction T. In such a structure, variations in the angles with respect to a position on the substrate 2 can be reduced, so manufacturing yield can be improved, and the manufacturing cost can be reduced. In FIG. 27, the insulating layer 16 is disposed between the pair of adjacent obliquely-grown magnetic layers 11A and 11B; however, the vertically grown magnetic layer 14 may be disposed, and the same effects can be obtained in this case.

Figure 28A:
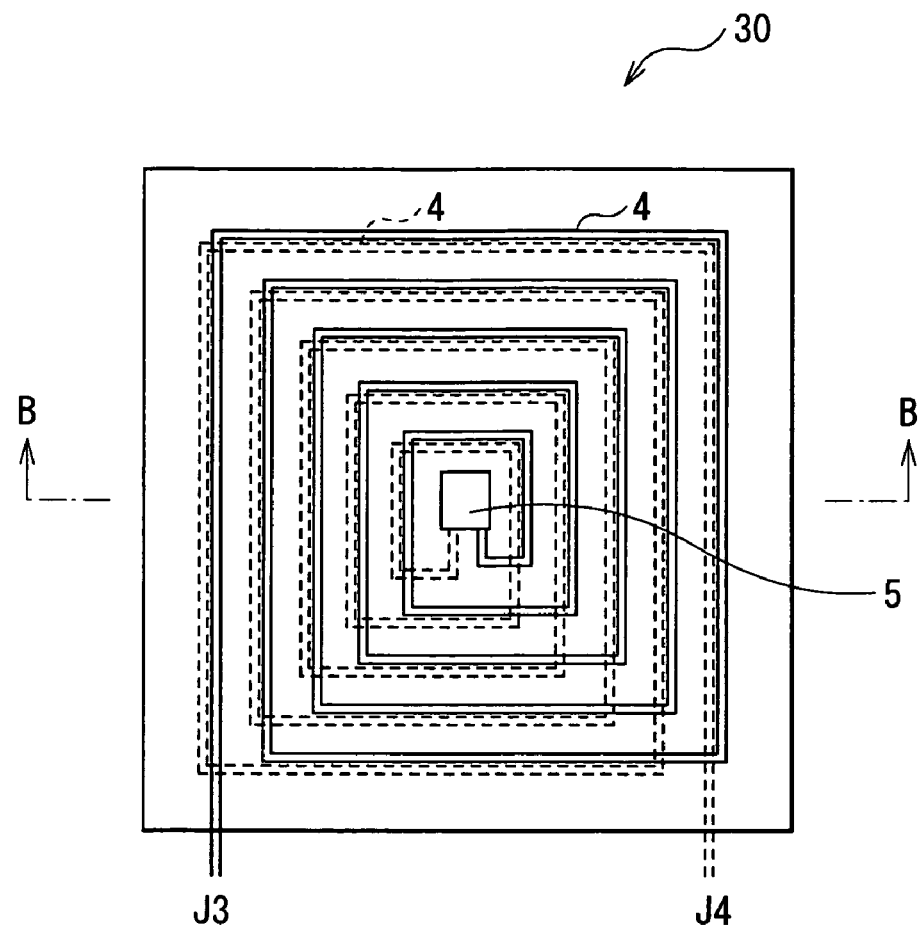
FIGS. 28A and 28B are schematic views of another example of the magnetic device according to the embodiment of the invention.
Figure 28B:
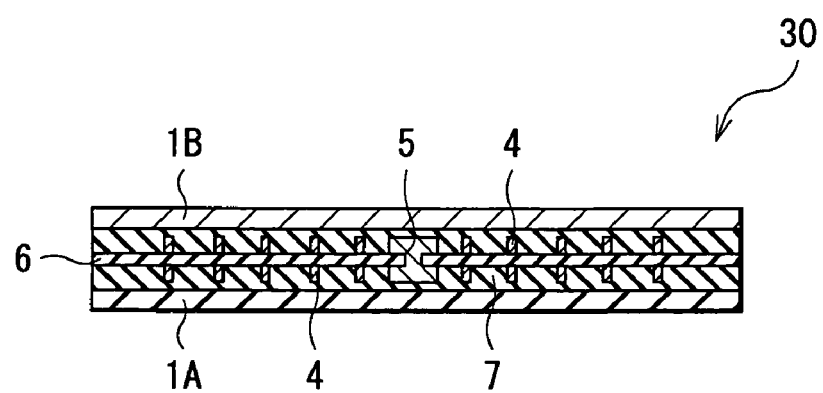

In the above embodiments, the case where the magnetic thin film 1, the planar coil 4 and the insulating layer 3 are disposed on one side of the substrate 2 is described; however, for example, as shown in FIGS. 28A and 28B (FIG. 28A shows a schematic top view, and FIG. 28B shows a schematic sectional view taken along a line B-B of FIG. 28A), the magnetic thin films 1A, 1B, the planar coil 4 and an insulating layer 7 may be disposed on each side of a substrate 6 (as an inductor 30). In this case, spiral planar coils 4 disposed on the front surface and the back surface of the substrate 6 are electrically connected to each other via a through hole 5. In such a structure, an inductor is formed between the connection terminals J3 and J4, and the same effects as those in the above embodiments can be obtained.

The materials, forming methods and forming conditions of each layer described in the above embodiments are not limited, and each layer may be made of any material with any thickness, and any other film forming method and any other film forming conditions may be used.

Obviously many modifications and variations of the present invention are possible in the light of the above teachings. It is therefore to be understood that within the scope of the appended claims the invention may be practiced otherwise than as specifically described.

What is claimed is:

1. A magnetic thin film, comprising:
   one or more obliquely-grown magnetic layers including an insulating material and a magnetic material which exhibits soft magnetism through mixing the insulating material into the magnetic material, the obliquely-grown magnetic layer being formed on a substrate, and being crystal-grown in a columnar form in an oblique direction with respect to a laminate surface; and
   one or more vertically grown magnetic layers including the insulating material and the magnetic material, and being crystal-grown in a columnar form in a vertical direction with respect to the laminate surface.

2. The magnetic thin film according to claim 1, further comprising:
   at least one insulating layer between the obliquely-grown magnetic layer and the vertically grown magnetic layer.

3. The magnetic thin film according to claim 1, wherein a plurality of the obliquely-grown magnetic layers are included, and an insulating layer is included each between one of obliquely-grown magnetic layer and the neighbor one.

4. The magnetic thin film according to claim 1, wherein a plurality of the obliquely-grown magnetic layers are included, and grown directions of columnar grains parallel to the laminate surface of the crystal growth directions in at least one pair of obliquely-grown magnetic layers are substantially orthogonal to each other.

5. The magnetic thin film according to claim 1, wherein in a pair of obliquely-grown magnetic layers which are located adjacent each other, an angle which a crystal growth direction in one obliquely-grown magnetic layer forms with the laminate surface increases from one end of the laminate surface to the other end of the laminate surface, and an angle which a crystal growth direction in the other obliquely-grown magnetic layer forms with the laminate surface increases from the other end of the laminate surface to the one end of the laminate surface.

6. The magnetic thin film according to claim 1, wherein the magnetic material includes iron (Fe) or cobalt iron (CoFe).

7. A magnetic device, comprising:
   coil; and
   a magnetic thin film disposed on one side of the coil,
   wherein the magnetic thin film includes an obliquely-grown magnetic layer including an insulating material and a magnetic material which exhibits soft magnetism through mixing the insulator into the magnetic material, and being crystal-grown in a columnar form in an oblique direction with respect to a laminate surface;
   the magnetic thin films are disposed on both sides of the coil so that the coil is sandwiched between the magnetic thin films; and
   at least one of the magnetic thin films further includes a vertically grown magnetic layer including the insulating material and the magnetic material and being crystal-grown in a columnar form in a vertical direction with respect to the laminate surface.

8. The magnetic device according to claim 7, wherein in a pair of obliquely-grown magnetic layers included, respectively, in the pair of magnetic thin films disposed on both side of the coil, grown directions of columnar grains parallel to the laminate surface of the crystal growth directions are substantially orthogonal to each other.

9. The magnetic device according to claim 7, wherein a pair of obliquely-grown magnetic layers included, respectively, in the pair of magnetic thin films disposed on both sides of the coil are plane symmetric to each other with reference to a plane in which the coil extends.

10. The magnetic device according to claim 7, wherein in a pair of obliquely-grown magnetic layers included, respectively, in the pair of magnetic thin films disposed on both sides of the coil, an angle which a crystal growth direction in one obliquely-grown magnetic layer forms with the laminate surface increases from one end of the laminate surface to the other end of the laminate surface, and an angle which a crystal growth direction in the other obliquely-grown magnetic layer forms with the laminate surface increases from the other end of the laminate surface to the one end of the laminate surface.

11. The magnetic device according to claim 7, wherein at least one of the magnetic thin films includes at least one insulating layer between the obliquely-grown magnetic layer and the vertically grown magnetic layer.

12. The magnetic device according to claim 7, wherein at least one of the magnetic thin films includes a plurality of the obliquely-grown magnetic layers, and an insulating layer each between the one obliquely-grown magnetic layer and the neighbor one.

13. The magnetic device according to claim 7, wherein the magnetic material includes iron (Fe) or cobalt iron (CoFe).

14. An inductor, comprising:
a magnetic device according to claim 7.

15. A magnetic thin film, comprising:
   one or more obliquely-grown magnetic layers including an insulating material and a magnetic material which exhibits soft magnetism through mixing the insulating material into the magnetic material, the obliquely-grown magnetic layer being formed on a substrate, and being crystal-grown in a columnar form in an oblique direction with respect to a laminate surface,
   wherein, in a pair of obliquely-grown magnetic layers which are located adjacent each other, an angle which a crystal growth direction in one obliquely-grown magnetic layer forms with the laminate surface increases from one end of the laminate surface to the other end of the laminate surface, and an angle which a crystal growth direction in the other obliquely-grown magnetic layer forms with the laminate surface increases from the other end of the laminate surface to the one end of the laminate surface.

16. A magnetic device, comprising:
a coil; and
a magnetic thin film disposed on one side of the coil,
   wherein the magnetic thin film includes an obliquely-grown magnetic layer including an insulating material and a magnetic material which exhibits soft magnetism through mixing the insulator into the magnetic material, and being crystal-grown in a columnar form in an oblique direction with respect to a laminate surface;

wherein the magnetic thin films are disposed on both sides of the coil so that the coil is sandwiched between the magnetic thin films; and wherein, in a pair of obliquely-grown magnetic layers included, respectively, in the pair of magnetic thin films disposed on both sides of the coil, an angle which a crystal growth direction in one obliquely-grown magnetic layer forms with the laminate surface increases from one end of the laminate surface to the other end of the laminate surface, and an angle which a crystal growth direction in the other obliquely-grown magnetic layer forms with the laminate surface increases from the other end of the laminate surface to the one end of the laminate surface.

* * * * *